United States Patent
Bhat et al.

(10) Patent No.: US 11,754,374 B2
(45) Date of Patent: Sep. 12, 2023

(54) ENERGY ABSORBING NANOCOMPOSITE MATERIALS AND METHODS THEREOF

(71) Applicant: University of Tennessee Research Foundation, Knoxville, TN (US)

(72) Inventors: Gajanan Bhat, Knoxville, TN (US);
Josh Fogle, Orangeburg, SC (US);
Jimmy W. Mays, Knoxville, TN (US);
Vikram Srivastava, Atlanta, GA (US)

(73) Assignee: University of Tennessee Research Foundation, Knoxville, TN (US)

( * ) Notice: Subject to any disclaimer, the term of this patent is extended or adjusted under 35 U.S.C. 154(b) by 624 days.

(21) Appl. No.: 14/676,257

(22) Filed: Apr. 1, 2015

(65) Prior Publication Data

US 2016/0200882 A1     Jul. 14, 2016

Related U.S. Application Data

(60) Provisional application No. 61/973,654, filed on Apr. 1, 2014.

(51) Int. Cl.
*F41H 1/02* (2006.01)
*F42D 5/045* (2006.01)
(Continued)

(52) U.S. Cl.
CPC .............. *F41H 1/02* (2013.01); *B32B 5/022* (2013.01); *B32B 5/26* (2013.01); *B32B 27/40* (2013.01);
(Continued)

(58) Field of Classification Search
CPC ....... C08J 5/005; C08J 2375/04; B82Y 30/00; F41H 1/02; F41H 5/0471; F42D 5/045;
D04H 1/4358; D10B 2231/10; D10B 2401/06; B32B 5/022; B32B 5/26; B32B 27/40; B32B 2250/20; B32B 2264/02; B32B 2264/025; B32B 2264/10; B32B 2264/108; B32B 2274/00; B32B 2307/536; B32B 2307/54; B32B 2307/56; B32B 2571/00; B32B 2571/02; B32B 2262/0215
(Continued)

(56) References Cited

U.S. PATENT DOCUMENTS 4,650,710 A * 3/1987 Harpell ................ F41H 5/0485
428/492
5,420,170 A   5/1995 Lutter et al.
(Continued)

OTHER PUBLICATIONS

Shore Durometer Conversion Chart, Thermal Tech Equipment. http://www.ttequip.com/knowledgelibrary/TechPageShoreDurometerConversionChart.htm, retrieved Ju. 4, 2006, Wayback machine.*
(Continued)

*Primary Examiner* — Jennifer A Gillett
(74) *Attorney, Agent, or Firm* — Jenkins, Taylor & Hunt, P.A.

(57) ABSTRACT

Composite materials capable of absorbing and dissipating high energy forces such as ballistic impacts and explosive blasts. Composites of elastomers and reinforcing nanoparticle materials are configured to absorb and dissipates high energy forces. Composites can be configured as nonwoven webs, and can be layered. Methods of making a ballistic resistant composite material capable of absorbing and dissipating high energy forces.

6 Claims, 2 Drawing Sheets

(51) Int. Cl.
　　　F41H 5/04　　　(2006.01)
　　　C08L 75/08　　(2006.01)
　　　B32B 5/02　　　(2006.01)
　　　C08L 75/06　　(2006.01)
　　　B32B 5/26　　　(2006.01)
　　　B32B 27/40　　(2006.01)
(52) U.S. Cl.
　　　CPC .............. C08L 75/06 (2013.01); C08L 75/08
　　　　　(2013.01); F41H 5/0471 (2013.01); F42D
　　　　　5/045 (2013.01); B32B 2250/20 (2013.01);
　　　　　B32B 2262/02 (2013.01); B32B 2262/0215
　　　　　(2013.01); B32B 2264/02 (2013.01); B32B
　　　　2264/025 (2013.01); B32B 2264/10 (2013.01);
　　　　　B32B 2264/108 (2013.01); B32B 2307/536
　　　　　(2013.01); B32B 2307/54 (2013.01); B32B
　　　　2307/56 (2013.01); B32B 2571/00 (2013.01);
　　　　　　　　　　　　B32B 2571/02 (2013.01)
(58) Field of Classification Search
　　　USPC ..................... 442/135, 328, 400; 428/423.1
　　　See application file for complete search history.

(56)　　　　　　　References Cited

U.S. PATENT DOCUMENTS

| 6,251,493 | B1 | 6/2001 | Johnson et al. | |
|---|---|---|---|---|
| 6,391,935 | B1 | 5/2002 | Hager et al. | |
| 2003/0108633 | A1* | 6/2003 | Yamakawa | D04H 3/14 425/72.2 |
| 2003/0200861 | A1* | 10/2003 | Cordova | B32B 5/26 89/36.02 |
| 2005/0257678 | A1* | 11/2005 | Camp | F41C 33/06 89/36.07 |
| 2009/0326128 | A1* | 12/2009 | Macossay-Torres | B82Y 30/00 524/413 |
| 2010/0048076 | A1* | 2/2010 | Creyghton | D06M 10/025 442/135 |
| 2010/0170746 | A1* | 7/2010 | Restuccia | B29C 70/083 181/290 |
| 2011/0151254 | A1* | 6/2011 | Fugetsu | D06M 10/06 428/368 |
| 2011/0159281 | A1* | 6/2011 | Marx | B82Y 30/00 428/343 |
| 2011/0250427 | A1* | 10/2011 | Kotov | B82Y 30/00 428/300.7 |
| 2012/0088050 | A1* | 4/2012 | Lavature | B32B 5/028 428/41.1 |

OTHER PUBLICATIONS

Zhu, Yong, et. al., Development of SHape Memory Polyurethane Fiber with Complete Shape Recoverability, Smart Mater. Struct. 15 (2006) p. 1385-1394.*
Chen, Kai Loon and Menachem Elimelech, Aggregation and Deposition Kinetics of Fullerene (C60) Nanoparticles, Langmuir 22 (2006), 100994-11001.*
Reddy, G.V. Raghunath, B.L. Deopura, and Mangala Joshi, Studies of Dry-Jet-Wet Spun Polyurethane Fibers, Journal of Applied Polymer Science, vol. 116 (2010), 843-851.*
Complete Textile Glossary, Celanese Acetate LLC, 2001.*
Breese and Ko, "Fiber Formation During Melt Blowing," Int. Nonwovens J., pp. 21-28 (2003).
Bresee and Qureshi, "Influence of Processing Conditions on Melt Blown Web Structure. Part I-DCD," International Nonwovens Journal, vol. 13, No. 1 pp. 49-55 (2004).
Casalini et al., "Nanofiller Reinforcement of Elastomeric Polyurea," Polymer, vol. 53, No. 6 pp. 1282-1287 (2012).
Chan et al., "Polypropylene/Calcium Carbonate Nanocomposites," Polymer, vol. 43, No. 10 pp. 2981-2992 (2002).
Deniz Duran, "Investigation of the Physical Characteristics of Polypropylene Meltblown Nonwovens Under Varying Production Parameters," Thermoplastic Elastomers, Prof. Adel El-Sonbati (Ed.) (2012); ISBN 978-953-51-0346-2, InTech, DOI:10.5772/36798.
Ellison et al., "Melt Blown Nanofibers: Fiber Diameter Distributions and Onset of Fiber Breakup," Polymer, vol. 48, No. 11 pp. 3306-3316 (2007).
Fogle, "Processing, Structure, and Properties of Nanoparticle Reinforced NonWoven Sandwich Composites," PhD Dissertation, University of Tennessee, Dec. 2013; http://trace.tennessee.edu/utk_graddiss/2570.
Fogle, "Processing, Structure, and Properties of Nanoparticle Reinforced NonWoven Sandwich Composites," slide presentation for PhD defence, Nov. 12, 2013.
Fragiadakis et al., Polymer, vol. 51 pp. 178-184 (2010).
Gazzola, "Melt Blown Poly(lactic acid) for Application as a Tissue Engineering Scaffold," Master's Thesis, University of Tennessee, 2012; http://trace.tennessee.edu/utk_gradthes/1379.
Grujicic et al., "Blast-wave Impact-mitigation Capability of Polyurea when Used as Helmet Suspension-pad Material," Materials & Design, vol. 31, No. 9 pp. 4050-4065 (2010).
Grujicic et al., "Computational Investigation of Impact Energy Absorption Capability of Polyurea Coatings via Deformation-induced Glass Transition," Materials Science and Engineering: A, vol. 527, No. 29-30 pp. 7741-7751 (2010).
Khan et al., "Development of Stiff, Strong, yet Tough Composites by the Addition of Solvent Exfoliated Graphene to Polyurethane," Carbon, vol. 48, No. 14 pp. 4035-4041 (2010).
Lane et al., "Materials for Blast and Penetration Resistance," The AMPTIAC Quarterly, vol. 6, No. 4 pp. 39-45 (2002).
Lee and Wadsworth, "Effects of Melt-Blowing Process Conditions on Morphological and Mechanical Properties of Polypropylene Webs," Polymer, vol. 33, No. 6 pp. 1200-1209 (1992).
Okie, "Traumatic Brain Injury in the War Zone," The New England Journal of Medicine, vol. 352.20 pp. 2043-2047 (2005).
Przekwas et al., "Integrated Experimental and Computational Framework for the Development and Validation of Blast Wave Brain Biomechanics and Helmet Protection," Proc. HFM-207 NATO Symposium on a Survey of Blast Injury Across the Full Landscape of Military Science, Halifax, Nova Scotia, 20 pages, 2011.
Roland and Casalini, "Effect of Hydrostatic Pressure on the Viscoelastic Response of Polyurea," Polymer, vol. 48, No. 19, pp. 5747-5752 (2007).
Roland et al., "Elastomer-steel Laminate Armor," Composite Structures, vol. 92, No. 5 pp. 1059-1064 (2010).
Rubin, "Asymmetric Threat Concept and its Reflections on International Security," Strategic Research and Study Center (SAREM), Istambul, 20 pages, May 31, 2007.
Ruff et al., "Headaches among Operation Iraqi Feedom/Operation Enduring Freedom Veterans with Mild Traumatic Brain Injury Associated with Exposure to Explosions," Journal of Rehabilitation Research & Development, vol. 45, No. 7 pp. 941-952 (2008).
Sarva et al., Polymer, vol. 48 pp. 2208-2213 (2007).
Speckhard, et al., "Properties of Polyisobutylene Polyurethane Block Copolymers: 2. Macroglycols Produced by the "inifer" Technique," Polymer, vol. 26, No. 1 pp. 55-69 (1985).
Srivastava et al. "High-Yield Synthesis of Mesoscopic Conductive and Dispersible Carbon Nanostructures via Ultrasonication of Commerical Precursors," Ind. Eng. Chem. Res., vol. 53 pp. 9781-9791 (May 20, 2014).
Van Bogart et al., "Annealing-induced Morphological Changes in Segmented Elastomers," Polymer, vol. 22, No. 10 pp. 1428-1438 (1981).
Vincent, "Impact Strength and Mechanical Losses in Thermoplastics," Polymer, vol. 15, No. 2 pp. 111-116 (1974).
Wang et al., "Preparation, Characterization, and Properties of Polyurethane-Grafted Multiwalled Carbon Nanotubes and Derived Polyurethane Nanocomposites," Journal of Nanomaterials, vol. 2011, Article ID 814903, 9 pages (2011); DOI:10.1155/2011/814903.
Yi et al., "Large Deformation Rate-dependent Stress-strain Behavior of Polyurea and Polyurethanes," Polymer, vol. 47, No. 1 pp. 319-329 (2006).

(56) References Cited

OTHER PUBLICATIONS

Zapletalova et al., "Polyether Based Thermoplastic Polyurethane Melt Blown Nonwovens," J. of Engineered Fibers and Fabrics, vol. 1, No. 1 pp. 62-72 (2006).
Zhang et al., "Crystallization and Impact Energy of Polypropylene/CaCO3 Nanocomposites with Nonionic Modifier," Polymer, vol. 45, No. 17 pp. 5985-5994(2004).
Tabor et al., "Blast-Related Traumatic Brain Injury: What is Known?" J. Neuropsychiatry Clin. Neurosci., vol. 18 pp. 141-145 (2006).
Amirkhizi et al., "An experimentally-based viscoelastic constitutive model for polyurea, including pressure and temperature effects," Philos. Mag., vol. 86, pp. 5847-5866 (2006).
Bianchi et al., "Stiffness and Energy Dissipation in Polyurethane Auxetic Foams," Journal of Materials Science, vol. 43, No. 17, pp. 5851-5860 (2008).
Bogoslovov et al., "Impact-induced Glass Transition in Elastomeric Coatings," Applied Physics Letters, vol. 90, No. 22, pp. 221910-221913 (2007).
Carey et al., "Ballistic Helmets and Aspects of Their Design," Neurosurgery, vol. 47, No. 3, pp. 678-689 (2000).
Kamal et al., "The effect of pressure and clay on the crystallization behavior and kinetics of polyamide-6 in nanocomposites," Polymer Engineering & Science, vol. 42, No. 9 pp. 1883-1896 (2002).
LeBaron et al., "Polymer-layered silicate nanocomposites: an overview," Appl. Clay Sci., vol. 15, pp. 11-29 (1999).
Lee and Wadsworth, "Process Property Studies of Melt Blown Thermoplastic Polyurethane Polymers for Protective Apparel," International Nonwovens Journal, pp. 2-9 (2005).
Mackintosh et al., "Dynamic Characteristics and Processing of Fillers in Polyurethane Elastomers for Vibration Damping Applications," Proceedings of the Institution of Mechanical Engineers, Part L: Journal of Materials: Design and Applications, vol. 225, No. 3, pp. 113-122 (2011).
Martin et al., "Effect of Soft-Segment CH2/O Ratio on Morphology and Properties of a Series of Polyurethane Elastomers," Journal of Applied Polymer Science, vol. 60, No. 4, pp. 557-571 (1996a).
Martin et al., "The Effect of Average Soft Segment Length on Morphology and Properties of a Series of Polyurethane Elastomers. II. SAXS-DSC Annealing Study," Journal of Applied Polymer Science, vol. 64, No. 4, pp. 803-817 (1997).
Meyer, et al., "Severe and Penetrating Traumatic Brain Injury in the Context of War," Journal of Trauma Nursing, vol. 15, No. 4, pp. 185-191 (2008).
Moulton, "Rethinking IED Strategies: From Iraq to Afghanistan," Military Review, pp. 26-33 (2009).
Nunes et al., "Polymer-filler Interactions and Mechanical Properties of a Polyurethane Elastomer," Polymer Testing, vol. 19, No. 1 pp. 93-103 (2000).
Pathak et al., "Structure Evolution in a Polyurea Segmented Block Copolymer Because of Mechanical Deformation," Marcromolecules, vol. 41, pp. 7543-7548 (2008).
Shim et al., "Using split Hopkinson pressure bars to perform large strain compression tests on polyurea at low, intermediate and high strain rates," Int.J. Impact Eng., vol. 36, pp. 1116-1127 (2009).
Tan et al., "Meltblown Fibers: Influence of Viscosity and Elasticity on Diameter Distribution," Journal of Non-Newtonian Fluid Mechanics, vol. 165, No. 15-16, pp. 892-900 (2010).
Vaidya et al., "Impact and Post-impact Vibration Response of Protective Metal Foam Composite Sandwich Plates," Materials Science and Engineering: A, vol. 428, No. 1-2, pp. 59-66 (2006).
Velankar and Cooper, "Microphase Separation and Rheological Properties of Polyurethane Melts. 1. Effect of Block Length," Macromolecules, vol. 31, No. 26, pp. 9181-9192 (1998a).
Velankar and Cooper, "Microphase Separation and Rheological Properties of Polyurethane Melts. 2. Effect of Block Incompatibility on the Microstructure," Macromolecules, vol. 33, No. 2, pp. 382-394 (1999b).
Xin and Wang, "Mechanism of Fiber Formation in Melt Blowing," Industrial & Engineering Chemistry Research, vol. 51, No. 32, pp. 10621-10628 (2012).
Xue et al., "Penetration of DH-36 steel plates with and without polyurea coating," Mech. Mater., vol. 42, pp. 981-1003 (2010).
Agrawal, "High Performance Textiles for Ballistic Protection," Defense Science Research Conference and Expo (DSR), 2011.
Begenir et al., "Crystallization Behavior of Elastomeric Block Copolymers: Thermoplastic Polyurethane and Polyether-block-amide," Journal of Applied Polymer Science, vol. 111, No. 3 pp. 1246-1256 (2009).
Begenir et al., "Melt-blowing Thermoplastic Polyurethane and Polyether-block-amide Elastomers: Effect of Processing Conditions and Crystallization on Web Properties," Polymer Engineering & Science, vol. 49, No. 7 pp. 1340-1349 (2009).
Cheeseman and Bogetti, "Ballistic Impact into Fabric and Complaint Composite Laminates," Composite Structures, vol. 61, No. 1-2 pp. 161-173 (2003).
Chen et al., "Carbon Nanotube-rein forced Polyurethane Composite Fibers," Composites Science and Technology, vol. 66, No. 15 pp. 3029-3034 (2006).
Chen et al., "Glass Transition Behaviors of a Polyurethane Hard Segment Based on 4,4'-Diisocyanatodiphenylmethane and 1,4-Butanediol and the Calculation of Microdomain Composition," Marcromolecules, vol. 30, No. 17 pp. 5068-5074 (1997).
Choi et al., "Microstructure and Segmental Dynamics of Polyurea under Uniaxial Deformation," Macromolecules, vol. 45, No. 8 pp. 3581-3589 (2012).
Grujicic et al., "Molecular-level Computational Investigation of Shock-wave Mitigation Capablity of Polyurea," Journal of Materials Science, vol. 47, No. 23 pp. 8197-8215 (2012).
Guth, "Theory of Filler Reinforcement," Journal of Applied Physics, vol. 16, No. 1 pp. 20-25 (1945).
Khan, "Intelligent Viscoelastic Polyurethane Intrinsic Nanocomposites," Metallurgical and Materials Transactions A, vol. 41, No. 4 pp. 876-880 (2010).
Lee and Goettler, "Structure-property Relationships in Polymer Blend Nanocomposites," Polymer Engineering & Science, vol. 44, No. 6 pp. 1103-1111 (2004).
Pei et al., "Strong Nanocomposite Reinforcement Effects in Polyurethane Elastomer with Low Volume Fraction of Cellulose Nanocrystals," Macromolecules, vol. 44, No. 11 pp. 4422-4427 (2011).
Roland, "Glass Transition in Rubbery Materials," Rubber Chemistry and Technology, vol. 85, No. 3 pp. 313-326 (2012).
Ryan et al., "Order-disorder Transition in a Block Copolyurethane," Macromolecules, vol. 25, No. 23 pp. 6277-6283 (1992).
Tekalur et al., "Blast Resistance of Polyurea Based Layered Composite Materials," Composite Structures, vol. 84, No. 3 pp. 271-281 (2008).
Vaidya et al., "Low Velocity Impact and Vibration Response of Multi-Functional Sandwich Plates." (No Date).
Vaidya et al., "Material Damping Studies on Carbon-Carbon Composites," Carbon, vol. 30, No. 6 pp. 925-929 (1992).
Vaidya et al., "Vibration Response of 3D Space Accessible Sandwich Composite," J. Reinf. Plas. and Compos., vol. 28 pp. 1587-1599 (2009).
Xia and Song, "Preparation and Characterization of Polyurethane-Carbon Nanotube Composites," Soft Matter, vol. 1, No. 5 pp. 386-394 (2005).
"DOD Dictionary of Military and Associative Terms," Joint Armed Forces, Aug. 2017.
Fullerene—SES Research, pp. 1-3 (2013) https.://sesres.com.
Hybrid Plastics. MA0736 Optical Hare Coating. Acrylo POSS, p. 1 (2013).
"Improvised Expolsive Devices (IEDs)—Iraq" Nov. 1, 2005, Gobalsecurity.org, pp. 1-5 (Apr. 14, 2009).
Macioce "Viscoelastic Damping 101," Roush Industries, Livonia, Michigan, pp. 1-2 (2013).
Molded Dimensions Inc. "Diversity in Rubber Manufacturing," pp. 1-5 (2017).
"NanoMaterials," Polymer Applications, N.p., n.d., Web., pp. 1-3 (2013).
"Polymers and Plastics: A Chemical Introduction," pp. 1-15 (2009).

(56) References Cited

OTHER PUBLICATIONS

Boyer, "Dependence of Mechanical Properties on Molecular Motion in Polymers," Polymer Engineering & Science, vol. 8, No. 3 pp. 161-185 (1968).
Brinson and Brinson, "Polymer Engineering Science and Viscoelasticity: An Introduction," Springer, Second Edition [Whole Book] (Jan. 24, 2015).
Chafi et al., "Biomechanical Assessment of Brain Dynamic Responses Due to Blast Pressure Waves," Annals of Biomedical Engineering, vol. 38, No. 2, pp. 490-504 (2010).
Chen et al., "Fiber Diameter of Polybutylene Terephthalate Melt-Blown Nonwovens," Journal of Applied Polymer Science, vol. 97, No. 4 pp. 1750-1752 (2005).
Chen et al., "Studies on the First DSC Endotherm of Polyurethane Hard Segment Based on 4,4'-Diphenylmethane Diisocyanate and 1,4-Butanediol," Macromolecules, vol. 31, No. 4 pp. 1312-1320 (1998).
Davidson et al., "Failure Mechanisms of Polymer-Reinforced Concrete Masonry Walls Subjected to Blast," J. Struct. Eng., ASCE, vol. 131 pp. 1194-1205 (2005).
Duan et al., "Finite Element Modeling of Transverse Impact on a Ballistic Fabric," International Journal of Mechanical Sciences, vol. 48 pp. 33-43 (2006).
Flory, "Principles of Polymer Chemistry," Tenth Print Edition, Cornell University Press: Ithaca, New York, 1978.
Gu and Mather, "Entanglement-based Shape Memory Polyurethanes: Synthesis and Characterization," Polymer, vol. 53, No. 25 pp. 5924-5934 (2012).
Heijboer, "Modulus and Damping of Polymers in Relation to Their Structure," British Polymer Journal, vol. 1, No. 1 pp. 3-14 (1969).
Hu and Koberstein, "The Effect of Thermal Annealing on the Thermal Properties and Molecular Weight of a Segmented Polyurethane Copolymer," Journal of Polymer Science Part B: Polymer Physics, vol. 32, No. 3; pp. 437-446 (1994).
Hwang et al., "Efficient Load Transfer to Polymer-Grafted Multiwalled Carbon Nanotubes in Polymer Composites," Advanced Functional Materials, vol. 14, No. 5; pp. 487-491 (2004).
Jiao et al., "High Strain Rate Response of an Elastomer," in Shock Compression of Condensed Matter 2005, Parts 1 and 2, vol. 845 pp. 809-812 (2006).
Koberstein and Galambos, "Multiple Melting in Segmented Polyurethane Block Copolymers," Macromolecules, vol. 25, No. 1 pp. 5618-5624 (1992).
Koberstein and Leung, "Compression-molded Polyurethane Block Copolymers. 2. Evaluation of Microphase Compositions," Macromolecules, vol. 25, No. 23 pp. 6205-6213 (1992).
Koberstein and Russell, "Simultaneous SAXS-DSC Study of Multiple Endothermic Behavior in Polyether-Based Polyurethane Block Copolymers." Macromolecules, vol. 19, No. 3 pp. 714-720 (1986).
Koberstein et al., "Compression-molded Polyurethane Block Copolymers. 1. Microdomain Morphology and Thermomechanical Properties," Macromolecules, vol. 25, No. 23, pp. 6195-6204 (1992).
Krutka et al., "Analysis of a Melt-Blowing Die: Comparison of CFD and Experiments," Industrial & Engineering Chemistry Research, vol. 41, pp. 5125-5138 (2002).
Krutka et al., "Effects of Die Geometry on the Flow Field of the Melt-Blowing Process," Industrial & Engineering Chemistry Research, vol. 42, pp. 5541-5553 (2003).
Krutka et al., "Effects of Temperature and Geometry on the Flow Field of the Melt Blowing Process," Industrial & Engineering Chemistry Research, vol. 43, pp. 4199-4210 (2004).
Lee and Wadsworth, "Structure and Filtration Properties of Melt Blown Polypropylene Webs," Polymer Engineering & Science, vol. 30, No. 22, pp. 1413-1419 (1990).
Lee and Wadsworth, "Fiber and Web Formation of Melt-Blown Thermoplastic Polyurethane Polymers," Journal of Applied Polymer Science, vol. 105, No. 6 pp. 3724-3727 (2007).
Leung and Koberstein, "DSC Annealing Study of Microphase Separation and Multiple Endothermic Behavior in Polyether-based Polyurethane Block Copolymers," Macromolecules, vol. 19, pp. 706-713 (1986).
Li et al., "Multiphase Structure of a Segmented Polyurethane: Effects of Temperature and Annealing," Macromolecules, vol. 25, No. 26 pp. 7365-7372 (1992).
Liu et al., "Development and Filtration Performance of Polylactic Acid Meltblowns," Textile Research Journal, vol. 80, No. 9, pp. 771-779 (2010).
Marla and Shambaugh, "Modeling of the Melt Blowing Performance of Slot Dies," Industrial & Engineering Chemistry Research, vol. 43, pp. 2789-2797 (2004).
Martin et al., "The Effect of Average Soft Segment Length on Morphology and Properties of a Series of Polyurethane Elastomers. I. Characterization of the Series," Journal of Applied Polymer Science, vol. 62, No. 9 pp. 1377-1386 (1996b).
Martin et al., "The Influence of Composition Ratio on the Morphology of Biomedical Polyurethanes," Journal of Applied Polymer Science, vol. 71, No. 6 pp. 937-952 (1999).
Menard, "Dynamic Mechanical Analysis: A Practical Introduction," CRC Press: Boca Raton, Florida, pp. 1-9 (2008).
Mendelsohn et al., "Characteristics of a Series of Energy-Absorbing Polyurethane Elastomers," Rubber Chemistry and Technology, vol. 58, No. 5 pp. 997-1013 (1985).
Ng et al., "Effect of Segment Size and Polydisperisty on the Properties of Polyurethane Block Polymers," Polymer, vol. 14, No. 6 pp. 255-261 (1973).
Organoclays Nanoclay Additives for Reinforced Plastics, "Why Cloisite and Nanofil Additives?" (n.d.), p. 1 (2013).
Peleg, "Cushioning Energy Dissipation in Foam Polymers," Polymer Engineering & Science, vol. 20, No. 11, pp. 738-740 (1980).
Prat et al., "Contemporary Body Armor: Technical Data, Injuries, and Limits," European Journall of Trauma and Emergency Surgery, vol. 38, No. 2, pp. 95-105 (2012).
Seymour and Cooper, "Thermal Analysis of Polyurethane Block Polymers," Macromolecules, vol. 6, No. 1, pp. 48-53 (1973).
Shambaugh et al., "Next-Generation Modeling of Melt Blowing," Industrial & Engineering Chemistry Research, vol. 50, No. 21, pp. 12233-12245 (2011).
Shambaugh et al., "Modifying Air Fields to Improve Melt Blowing," Industrial & Engineering Chemistry Research, vol. 51, No. 8, pp. 3472-3482 (2012).
Sun et al., "Three-Dimensional Model of Whipping Motion in the Processing of Microfibers," Industrial & Engineering Chemistry Research, vol. 50, No. 2, pp. 1099-1109 (2010).
Takayanagi et al., "Application of equivalent model method to dynamic rheo-optical properties of crystalline polymer," J. Polym. Sci. Part: C; vol. 5, Issue 1, p. 113-122 (1964).
Tate and Shambaugh, "Temperature Fields below Melt-Blowing Dies of Various Geometries," Industrial & Engineering Chemistry Research, vol. 43, No. 17, pp. 5405-5410 (2004).
Wente, "Superfine Thermoplastic Fibers," Industrial & Engineering Chemistry, vol. 48, No. 8, pp. 1342-1346 (1956).
Yoon et al., "Damping Properties and Transmission Loss of Polyurethane. II. PU Layer and Copolymer Effect," Fibers and Polymers, vol. 4, No. 2, pp. 49-53 (2003).
Zhou et al., "Modeling the Melt Blowing of Viscoelastic Materials," Chemical Engineering Science, vol. 66, No. 18, pp. 4172-4183 (2011).
Counto, "The effect of the elastic modulus of the aggregate on the elastic modulus, creep and creep recovery of concrete," Magazine of Concrete Research, vol. 17, No. 52, pp. 142-151 (Sep. 1965).
Eschel, "IED Blast Related Brain Injuries: The Silent Killer" accessed Dec. 13, 2017, 11:36 AM from http://defense-update.com/20070527_blast.html.
Molded Dimensions, Inc., "Shear", accessed Jan. 31, 2018 from https://moldeddimensions.com/shear.php.
Srivastava et al., "Macroscopic Tailoring of Two-Dimensional Layered Hexagonal Materials by Liquid-Redox Exfoliation," (Mar. 2014) In *Abstracts of Papers of the American Chemical Society* (vol. 247). 1155 16th ST, NW, Washington, DC 20036 USA: Amer Chemical Soc.

(56) References Cited

OTHER PUBLICATIONS

Srivastava et al., "Macroscopic Properties of Restacked, Redox-Liquid Exfoliated Graphite and Graphite Mimics Produced in Bulk Quantities," Adv. Funct. Mater. 2014, 24, 4969-4977.
Taber, et al., (2006) "Blast Related Traumatic Brain Injury: What is known?" J. Neuropsychiarty Clin. Neurosci; pp. 141-145.

* cited by examiner

ENERGY ABSORBING NANOCOMPOSITE MATERIALS AND METHODS THEREOF

RELATED APPLICATIONS

The presently disclosed subject matter claims the benefit of U.S. Provisional Patent Application Ser. No. 61/973,654, filed Apr. 1, 2014; the disclosure of which is incorporated herein by reference in its entirety.

GOVERNMENT INTEREST

This invention was made with government support under N00014-10-1-0393 awarded by the Office of Naval Research. The government has certain rights in the invention.

TECHNICAL FIELD

The presently disclosed subject matter relates in some embodiments to nanoparticle reinforced elastomer composite materials with enhanced energy absorption properties. In some embodiments, the presently disclosed subject matter relates to antiballistic composite materials which can be used to protect an individual from high energy shock waves generated from ballistic impacts.

BACKGROUND

Shockwaves produced from ballistic impacts and improvised explosive devices (IED) are capable of causing severe internal trauma to soldiers. Current antiballistic materials give adequate protection to soldiers from high velocity impacts, however they are insufficient at absorbing and dissipating shockwave energy generated by these impacts and explosive blasts. Increased encounters with explosive devices have led to more blast induced brain injuries, or traumatic brain injuries (TBI), such as concussions, contusion, hemorrhaging, and axonal injury. There remains a need to understand the nature of the injury, how it occurs, and what can be done to prevent them.

Currently, IEDs are one of the biggest threats to soldiers abroad. One reason for this is due to the very nature of IEDs as they are produced in low technology, makeshift methods with random items. This makes them hard to locate prior to detonation. IEDs can be detonated either remotely, by disturbance, or by suicide bombers. Injury can occur by either infringement of projectiles or fragments incorporated in the device or debris from surrounding structures disturbed by the blast. Also generated in the blasts are shockwaves which propagate at high rates from the detonation site and are capable of causing great destruction to surrounding structures and severe bodily harm to individuals in its proximity.

While personal protection gear has been greatly improved over the years, protection from shockwaves generated by IED explosions, and other ordinances, has never been a priority. The threats of asymmetric weapons can be deterred through the implementation of a multifaceted strategy, which includes intelligence, data acquisition and analysis, and disruption of the asymmetric threat chain and technology through the utilization of protective gear, armored military vehicles, and hand held shields, etc. There are certain necessary requirements for protective gear in such situations. For example, usable materials must be lightweight, balanced, durable, cost-effective, and compatible with other equipment, comfortable, reusable, water repellent, moisture-vapor permeable, fire resistant, and camouflage capable. The gear should also have a low heat stress, contain the ability to defeat projectiles, and have a longer service life.

A composite material can fulfill such a multitude of properties. However, currently much of the military protective gear is fabricated from composite materials based off very strong yet stiff and brittle fibers. These materials perform well at preventing penetration of projectiles, but are inefficient at absorbing and dissipating the remaining projectile energy, or kinetic energy, and shockwaves generated from explosions. A different material is required to absorb and dissipate this type of energy.

As such, there remains a need for materials with enhanced capabilities to absorb energy from shock waves and/or kinetic energy associated with explosions. More particularly, there remains a need for anti-ballistic personal armor that is both effective at preventing projectile penetration as well as absorbing the remaining kinetic energy of the impact or shockwaves generated by explosions.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, provided herein is a composite material capable of absorbing and dissipating high energy forces comprising an elastomer, and a reinforcing nanoparticle material, wherein the composite material absorbs and dissipates high energy forces more than the elastomer alone or the reinforcing nanoparticle material alone. In some embodiments, the composite further comprises a plurality of layers of a web, wherein the web comprises the elastomer and the reinforcing nanoparticle material. In some embodiments, the web is a nonwoven web. In some embodiments, the elastomer is selected from the group consisting of a thermoplastic polyurethane polymer, a non-thermoplastic polyurethane, a polyolefin polyamide and copolyester based elastomers. In some embodiments, the elastomer comprises a thermoplastic polyurethane polymer. In some embodiments, the polyurethane polymer comprises an aromatic based hard segment and an ether or ester based soft segment.

In some embodiments, the elastomer has a shore A hardness of about 30-100. In some embodiments, the elastomer has a shore A hardness of 90. In some embodiments, the elastomer has a shore D hardness of about 5-70. In some embodiments, the elastomer has a glass transition temperature of about −20° C. to about 100° C. In some embodiments, the glass transition temperature occurs at a frequency of about 1 hertz to about 1000 hertz. In some embodiments, the elastomer has a glass transition temperature of about −15° C. to about 30° C. In some embodiments, the glass transition temperature occurs at a frequency of about 1 hertz to about 1000 hertz. In some embodiments, the storage modulus and loss modulus of the elastomer increases as the shore hardness increases.

In some embodiments, the reinforcing nanoparticle material is selected from the group consisting of graphite, nanoclay, $carbon_{60}$, methacrylate isooctyl polyhedral oligomeric silsesquioxane, and inorganic disulfide nanotubes. In some embodiments, the reinforcing nanoparticle material is present in a total weight percent from about 0.1% to about 6%. In some embodiments, composite material comprises from about 2 to 30 layers. In some embodiments, the reinforcing nanoparticle material is incorporated by a method selected from the group consisting of dip coating, ultrasonic spray coating and melt blowing.

In some embodiments, the composite material is capable of enhancing the ballistic resistance of an article.

Also provided herein are methods of making a composite material capable of absorbing and dissipating high energy, the method comprising contacting an elastomer and a reinforcing nanoparticle material under conditions suitable to form a composite, wherein the composite material absorbs and dissipates high energy forces more than the elastomer alone or the reinforcing nanoparticle material alone. In some embodiments, layering two or more webs comprising an elastomer and a reinforcing nanoparticle material; and pressing the layered webs. In some embodiments, the web is a nonwoven web.

In some embodiments, the elastomer is a thermoplastic polyurethane polymer. In some embodiments, the polyurethane polymer comprises an aromatic based hard segment and an ether or ester based soft segment. In some embodiments, the elastomer has a shore A hardness of about 30-100. In some embodiments, the elastomer has a shore A hardness of 90. In some embodiments, the elastomer has a shore D hardness of about 5 to about 70. In some embodiments, the elastomer has a glass transition temperature of about −20° C. to about 100° C. In some embodiments, the glass transition temperature occurs at a frequency of about 1 hertz to about 1000 hertz. In some embodiments, the glass transition temperature is from about −15° C. to about 30° C. In some embodiments, the glass transition temperature occurs at a frequency of about 1 hertz to about 1000 hertz. In some embodiments, the storage modulus and loss modulus of the elastomer increases as the shore hardness increases.

In some embodiments, the reinforcing nanoparticle material is selected from the group consisting of graphite, nanoclay, $carbon_{60}$, methacrylate isooctyl polyhedral oligomeric silsesquioxane, and inorganic disulfide nanotubes. In some embodiments, the reinforcing nanoparticle material is present in the web at a total weight percent from about 0.1% to about 6%. In some embodiments, the layers comprises from about 2 to 30 layers. In some embodiments, the reinforcing nanoparticle material is contacted with the elastomer by a method selected from the group consisting of dip coating, ultrasonic spray coating and melt blowing. In some embodiments, the method further comprises hot pressing at a temperature from about 85° C. to about 200° C.

In some embodiments, the disclosed methods further comprise melt blowing a thermoplastic polyurethane polymer into a web, contacting the thermoplastic polyurethane polymer with a nanoparticle material under temperature and pressure, and fabricating the nanoparticle reinforced thermoplastic polyurethane polymer into a layered composite by hot press. In some embodiments, the nanoparticle-reinforced thermoplastic polyurethane polymer is fabricated into a layered composite material by hot pressing at a temperature from about 85° C. to about 200° C.

Also provided herein in some embodiments are articles capable of absorbing and dissipating high energy forces, comprising the composite materials disclosed herein and an article, wherein the article, when paired with the composite material, absorbs and dissipates high energy forces more than the article alone. In some embodiments, the article is ballistic resistant.

Accordingly, it is an object of the presently disclosed subject matter to provide composite materials capable of absorbing and dissipating high energy forces. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description and Examples.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, but merely to clarify and exemplify the presently disclosed subject matter.

For a more complete understanding of the presently disclosed subject matter, reference is now made to the following drawings in which.

DETAILED DESCRIPTION

Figure 1:
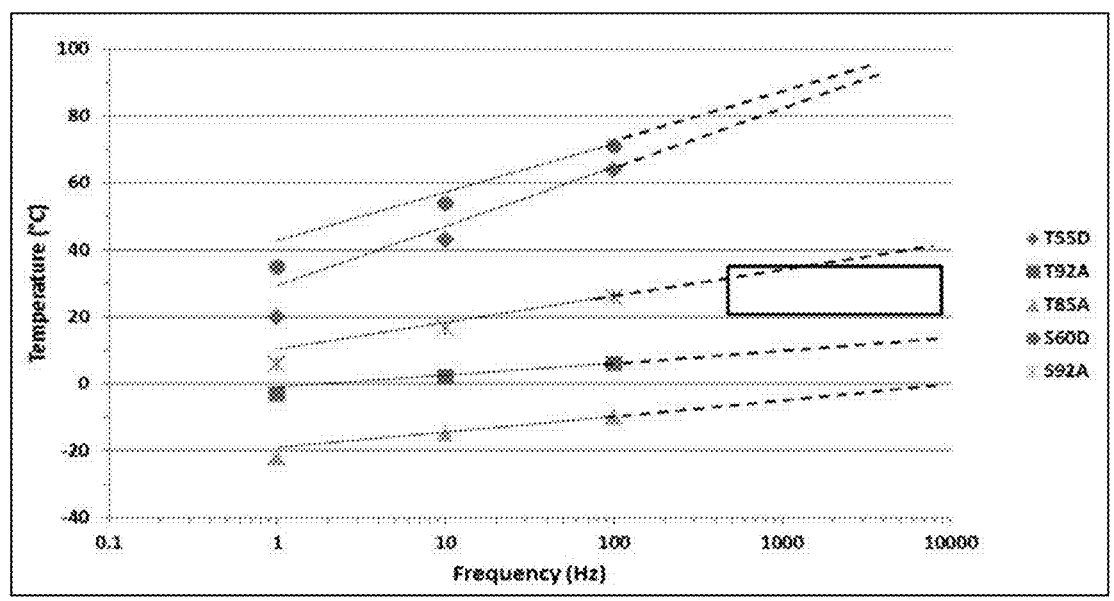
FIG. 1 is a graph depicting Tg predictions at high frequencies for composite materials. Legend: T55D (♦); T92A (■); T85A (▲); S60D (●); S92A (Ж).

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

The presently disclosed subject matter is directed to a composite material capable of absorbing and dissipating high energy forces, and methods of making the same. Generally, the composite material can in some embodiments comprise an elastomer, and a reinforcing nanoparticle material, wherein the composite material absorbs and dissipates high energy forces more than the elastomer alone or the reinforcing nanoparticle material alone.

In some embodiments, polyurethanes and/or other elastomers and elastomeric materials that have elastic and energy absorbing characteristics can be reinforced with nano particles to enhance their modulus and stiffness. In some embodiments, such reinforced materials can be incorporated with antiballistic materials as direct coating nano particle reinforced rubbery material, or by laminating antiballistic fabrics with nanoparticle reinforced polyurethanes or other elastomeric materials/fabrics.

In some embodiments, the presently disclosed subject matter is directed to elastic fibrous nanocomposites (in some embodiments, sandwich nanocomposites) to use as a protective layer behind the current anti-ballistic armor to minimize the transfer of energy and shockwave induced trauma an individual experiences from ballistic impacts and/or blast exposure. While anti-ballistic personal armor is generally effective at preventing projectile penetration to the underlying individual, it can be insufficient at absorbing the remaining kinetic energy of the impact or shockwaves generated by explosions. The present disclosure addresses these armor shortcomings by developing flexible shockwave absorbing protective panels from nanoparticle reinforced elastomeric fibrous composites (in some embodiments, sandwich composites) of light weight which can be used as a liner in conjunction with current antiballistic materials to minimize shockwave induced trauma soldier's experience. This addition to existing armor will be of minimal weight and may even allow for reduction of primary anti-ballistic layers.

Shockwaves are high speed, large-amplitude mechanical transients generated by violent impacts and explosions. They are caused by an extreme increase in pressure in a short amount of time which spreads out over a large area at high speeds. To be defined as a shockwave, the wave must be moving faster than the speed of sound, 340 m/s at sea level. It has been estimated that shockwaves may reach speeds of at least 1,600 ft/s (490 m/s) from the detonation point. In ballistic impacts, the kinetic energy of the projectile is transferred to the material at impact. Depending on the type of material impacted, some of the kinetic energy is dissipated through deformation and material failure at and near the impact zone. The remaining energy is then transferred to the impacted object and dispersed throughout the impacted material, being reflected and amplified at edges and junction points in a manner similar to shockwaves generated by explosions.

A blast or explosion results when solids or liquids are rapidly converted into a gas. In this state, the gas molecules become heated and highly pressurized. The heated gas expands into the surrounding air at speeds higher than that at which sound travels, compressing the air and creating a peak of overpressure wave or shockwave radiating from the point of detonation. Closely following the shockwave is a blast wind that also radiates from the point of detonation. As the gas expands, the pressure drops and creates a vacuum or negative pressure wave. The effects of the primary overpressure wave are nonlinear and very complex. The damage produced by the overpressure wave typically decreases exponentially from the blast epicenter. If the explosion is detonated within an enclosed space or if the blast waves travel inside an enclosed space, then the effects of the blast waves become additive nonlinearly as the waves reflect off walls, floors, and ceilings. The discontinuous waves cause abrupt changes in density and pressure which can reach the range of giga Pascals (GPa).

A ballistic impact is generally described as a low-mass high velocity impact by a projectile propelled by a source onto a target. The high velocity impact may be initiated from handguns, rifles, and fragments or debris from explosive devices. During the ballistic impact, energy transfer takes place from the projectile to the target. The nature of the impact strongly depends on the properties of the projectile and target. Aspects of the two include the shape, size, velocity, and constitute material properties of the projectile and the material properties and makeup of the target. For impacts corresponding to typical velocities from defense related terminal ballistics (about 0.3 to 2 km/s), the peak strain rates generated are of the order of $10^5$ to $10^6$ $s^{-1}$. All strain rates below the peak strain rate are likely to also be developed during the event at sufficiently long times and substantial deformation may occur as these lower strain rates as well as they are sustained for longer periods of time. Upon impact, a series of physical phenomena takes place in a very short period of time: elastic and plastic wave propagation, fracture and fragmentation, perforation, and spallation. Unfortunately, these phenomena are yet to be fully understood and controlled. This is mainly due to the very quick time scales in which these phenomena occur, making observation and data collection difficult.

An explosive device is a device that relies on the exothermic reactions of an explosive material to provide an extremely sudden and violent release of energy. These include devices such as grenades, missiles, bombs, mortars, and the so called improvised explosive device (IED). Thus, there is a need for composite materials capable of absorbing and dissipating high energy forces.

Following long-standing patent law convention, the terms "a" and "an" mean "one or more" when used in this application, including the claims. Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter. Thus, the term "about", as used herein when referring to a value or to an amount of mass, weight, time, temperature, volume, or percentage is meant to encompass variations of ±20% or ±10%, more preferably ±5%, even more preferably ±1%, and still more preferably ±0.1% from the specified amount, as such variations are appropriate to perform the disclosed method.

The term "and/or" when used to describe two or more activities, conditions, or outcomes refers to situations wherein both of the listed conditions are included or wherein only one of the two listed conditions are included. The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim. As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole. As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

The terms "high energy", "high energy shock wave", "high kinetic energy", "high energy blast", and/or variants thereof, when used to describe the enhanced energy absorbing properties of the disclosed composite materials, refer in some embodiments to energy forces caused by ballistic impacts, ordinance explosions, IED explosions, and other explosive events. Such "high energy" forces or shock waves can comprise a strain rate ranging from about $10^4$ to about $10^6$ per second under these conditions.

In some embodiments, disclosed herein are composite materials capable of absorbing and dissipating high energy forces. Such composite materials can in some embodiments comprise an elastomer and a reinforcing nanoparticle material. The composite materials in some embodiments are configured to absorb and dissipate high energy forces more than the elastomer alone or the reinforcing nanoparticle material alone could dissipate.

In some embodiments, the composite materials can comprise a plurality of layers of a web, wherein the web can comprise the elastomer and the reinforcing nanoparticle material. The web can in some aspects be a nonwoven web. Where the composite comprises layers, the layers can include from about 2 to about 30 layers.

In some embodiments, the elastomer of the composite material can comprise any polymer with elastic recovery from large breaking elongation, such as thermoplastic polyurethane polymer, non-thermoplastic polyurethanes, polyolefin polyamide and copolyester based elastomers. Where the elastomer is a thermoplastic polyurethane (TPU) polymer, the thermoplastic polyurethane polymer can comprise an aromatic based hard segment and an ether or ester based soft segment. The elastomer, or thermoplastic polyurethane polymer, can in some aspects have a shore A hardness of about 30 to about 100, and optionally a shore A hardness of about 80, 85, 90 or 95. In some aspects, the elastomer, or thermoplastic polyurethane polymer, can have a shore D hardness of about 5 to about 70. In the composite material the storage modulus and loss modulus of the elastomer increase as the shore hardness increases.

Where a thermoplastic polyurethane polymer is used, it can in some aspects have a glass transition temperature of about −20° C. to about 100° C. Moreover, this glass transition temperature can occur at a frequency of about 1 hertz to about 1,000 hertz. Optionally, in some embodiments, the glass transition temperature is from about −15° C. to about 30° C., and occurs at a frequency of about 1 hertz to about 1000 hertz.

In some embodiments, the reinforcing nanoparticle material used in the composite material can be selected from graphite, nanoclay, carbon 60 ($C_{60}$), polyhedral oligomeric silsesquioxanes (POSS), and inorganic disulfide nanotubes. The reinforcing nanoparticle material can be present in a total weight percent from about 0.1% to about 6%, or about 0.5% to about 5%, or about 1%, about 1.5%, about 2%, about 2.5%, about 3%, about 3.5%, about 4%, about 4.5%, about 5%, about 5.5% or about 6%. In some embodiments, the elastomer is present in an amount ranging from about 90% to about 99.9%, depending on the amount of reinforcing nanoparticle present in the composite. Thus, in some aspects, the amount of elastomer is that which is not reinforcing nanoparticle, e.g. 95% elastomer and 5% reinforcing nanoparticle. In some aspects, the reinforcing nanoparticle material can be incorporated by dip coating or ultrasonic spray coating the formed fabrics and/or by blending with the polymer before forming the fiber/fabric.

Such composite materials can in some embodiments be configured to be ballistic resistant when paired with an article, or can enhance the ballistic resistance of an article or material. More particularly, in some embodiments, the presently disclosed subject matter is directed to designing and fabricating elastic fibrous nanocomposites (in some embodiments, sandwich nanocomposites) to incorporate in and/or use as a layer behind current anti-ballistic armor to minimize the transfer of energy from an impact or explosion to the underlying individual. In some embodiments, polyurethanes and/or elastomeric materials that have elastic and energy absorbing characteristics can be reinforced with nanoparticles to enhance their modulus and toughness. In some embodiments, such reinforced materials can be incorporated with antiballistic materials as direct coating nanoparticle reinforced rubbery material, or by laminating antiballistic fabrics with nanoparticle reinforced polyurethanes or other elastomeric materials/fabrics. In some embodiments, the disclosed composites can be paired with, added to, or incorporated in articles to enhance the impact resistance and/or increase the kinetic energy absorption of the article.

The approach, in some embodiments, can comprise reinforcing TPU nonwoven webs with nanoparticles such as nanoclay, graphite, $C_{60}$, POSS and tungsten disulfide multi-walled nanotubes (INT). While TPU polymers, and other elastomeric materials, can have the capability to absorb high energy impacts or shock waves, this property can be enhanced, in some embodiments significantly, by reinforcing it with nanoparticles that have high modulus and energy absorption capability. Such a combination can result in a composite material with an enhanced capability to absorb and dissipate high energy forces more so than would be achieved by either an elastomeric material or nanoparticle alone.

To exploit these characteristics, studies were conducted that included physically dispersing nanoparticles into preformed TPU microfiber melt blown nonwoven webs and melt blowing webs with compounded TPU/nanoparticle blends. The webs were then fabricated into sandwich composites by compression molding. Methods were utilized such that these nanofiller infiltrated fabrics would have a fairly uniform distribution and dispersion of nanoparticles in the matrix. These sandwich nanocomposites were designed to exploit the energy dissipation capabilities of the raw materials and the composite design. Further details of these studies, and their results, can be found in the Examples below.

Without being limited by any particular theory, some possible energy dissipation mechanisms include strain induced phase transition, high frequency of the hard segments, viscous dissipation of the soft matrix, interaction with nanoparticles, nanoparticle mechanical properties, strain dispersion of the nonwoven fibers, friction at the nanoparticle/polymer interface, and the sandwich layer interfaces and delamination processes.

In some embodiments, ether and/or ester based soft segment thermoplastic polyurethanes of various shore hardness can be melt blown into microfiber webs with one being chosen for the reinforcing procedures. TPUs are commonly rated by shore hardness. Shore hardness is a measure of the resistance of a material to penetration of a spring loaded needle-like indenter. Shore A scale is used for testing soft elastomers and other soft polymers. Hardness of hard elastomers and most other polymer materials is measured by Shore D scale. A conversion scale for the two is shown in Table 1. Shore hardness may be used to relate a hard/soft segment ratios and mechanical properties.

As discussed further in the Examples, a web or composite material as disclosed herein can be reinforced with nanoparticles by dip and/or spray coating methods. The selected TPU or elastomer can also be compounded with $C_{60}$ fullerene and/or melt blown into nonwoven TPU/$C_{60}$ webs. Reinforced webs and/or composites can in some embodiments be fabricated into multi-ply sandwich composites.

TABLE 1

Shore hardness conversion table.

| Shore A | 45 | 50 | 55 | 60 | 65 | 70 | 75 | 80 | 85 | 90 | 95 | 100 |
|---------|----|----|----|----|----|----|----|----|----|----|----|-----|
| Shore D | 10 | 12 | 14 | 16 | 19 | 22 | 25 | 29 | 33 | 39 | 46 | 58  |

In some embodiments, provided herein are methods of making, synthesizing and/or producing composite materials as disclosed herein. Particularly, in some aspects provided herein are methods of making a ballistic resistant composite material capable of absorbing and dissipating high energy, where the method can comprise layering two or more webs comprising a thermoplastic polyurethane and a reinforcing nanoparticle material, and hot pressing the layered webs. In some embodiments, the webs can comprise nonwoven webs.

In some embodiments, the polyurethane polymers used in these methods can comprise aromatic based hard segments and/or ether or ester based soft segments. Moreover, the thermoplastic polyurethane polymer, or other elastomeric material, can have a shore A hardness of about 30-100, and optionally a shore A hardness of about 80, 85, 90 or 95. The shore D hardness can be about 5 to about 70. In the disclosed methods of making a composite material, the storage modulus and loss modulus of the thermoplastic polyurethane polymer, or other elastomeric material, can increase as the shore hardness increases.

In some embodiments, the thermoplastic polyurethane polymer used in the methods can have a glass transition temperature of about −20° C. to about 100° C., wherein the glass transition temperature can occur at a frequency of about 1 hertz to about 1000 hertz. More particularly, in some aspects the glass transition temperature can be about −15° C. to about 30° C.

In the disclosed methods, the reinforcing nanoparticle materials used can be selected from graphite, nanoclay, carbon$_{60}$, methacrylate isooctyl polyhedral oligomeric silsesquioxane and inorganic disulfide nanotubes. Such reinforcing nanoparticle materials can be present in the composite material, including the web where a web is used, at a total weight percent from about 0.1% to about 6%. The reinforcing nanoparticle materials can be incorporated into the composite material or web by dip coating, ultrasonic spray coating and/or melt blowing.

In some aspects, the method can be configured to produce a composite comprising multiple layers, where the number of layers can range from about 2 to about 30 layers. Where hot pressing is used in the disclosed methods, it can be performed at a temperature from about 85° C. to about 200° C.

In some embodiments, a method of making the disclosed composites can comprise melt blowing a thermoplastic polyurethane polymer into a web, contacting the thermoplastic polyurethane polymer with a nanoparticle material under temperature and pressure, and fabricating the nanoparticle reinforced thermoplastic polyurethane polymer into a layered composite by hot press. In such a method, the nanoparticle-reinforced thermoplastic polyurethane polymer can be fabricated into a layered composite material by hot pressing at a temperature from about 85° C. to about 200° C.

Alternatively, in some embodiments, an elastomer with nanoparticles dispersed can be coated onto antiballistic fabrics. This can be achieved either by a thermoplastic processing technique such as extrusion coating or laminating, or by solution based systems, especially when the elastomer is non-thermoplastic and easily processed with aqueous or non-aqueous solvents.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Materials Tested

Lubrizol Estane TPU

Estane 58315, 58219, 58271, 58277, and Estane ETE 55DT3, and 60DS3 TPU elastomers, provided by The Lubrizol Corporation (Wickliffe, Ohio, United States of America), were used in processing melt blown nonwoven webs. All of the TPUs have aromatic based hard segments. The 58000 series comprises 2 polyether-based soft segment TPUs and 2 polyester-based soft segment TPUs with matching shore hardness of 85A and 92A. The ETE (Easy to Extrude) TPUs comprise a polyether-based soft segment TPU with shore hardness of 55D and a polyester-based soft segment based TPU of shore hardness 60D. Within this study, ether and ester series will be denoted as Txxh and Sxxh, respectively, where T and S represent ether and ester based soft segments while the xx represents the shore hardness and h represents the shore hardness scale letter.

Estane 58215, an aromatic based hard segment and polyether-based soft segment TPU of 90A shore hardness was used for reinforcing with nanoparticles. It was chosen after analysis of the results for the melt blown webs of the TPUs detailed previously.

Nanofillers a. Nanoclay

The most common type of nanoclay used for reinforcement is montmorillonite (MMT) as it is readily available in large quantities at low cost, and its chemistry is well understood. Montmorillonites belong to the family of 2:1 smectic minerals whose layers are composed of two tetrahedral sheets linked to an octahedral sheet. Stacking of the layers occurs through weak van der Waals forces and can be broken up by intercalation into individual sheets having a high aspect ratio of around 1000 that can be subsequently dispersed in the polymer matrix for reinforcement. The d(001) spacing of montmorillonite, comprising the platelets separated by an interlayer called the gallery, can vary over a wide range from a minimum distance of 0.95 nm which corresponding to the fully collapsed state. Usually montmorillonite has negative charges on the interlayer gallery walls, in which cations such as $Na^+$ or $Ca^{2+}$ can be absorbed. To reduce the polar characteristic of the silicate, cation exchange reactions were used with various organic modifiers to render the hydrophilic silicate surface at least partially organophilic. Also, ion exchange advantageously increases the initial gallery spacing at the same time as improving compatibility with non-polar polymers. Generally the structure of nanocomposites can be differentiated by the degree of dispersion of the layered silicates. Layered silicates can assemble into tactoids, which are relatively large aggregates in the polymer matrix and thus resemble an immiscible phase as in a conventional microscale composite. Intercalated structure indicates that a single polymer chain diffuses into the galleries between the layers, resulting in formation of alternate layers of polymer and inorganic mineral. In the ideal exfoliated structure, the silicate layers are completely opened up and dispersed disorderly and uniformly in a continuous polymer matrix.

Cloisite 30B, a alkyl quaternary ammonium salt bentonite nanoclay, from Southern Clay Products Inc. (Gonzales, Tex., United States of America), was used. The nanoclay comprises organically modified nanometer scale, layered magnesium aluminum silicate platelets. The silicate platelets that the additives are derived from are about 1 nanometer thick and about 70 to about 150 nanometers across.

b. Graphite

Synthetic graphite powder was purchased from Sigma Aldrich (St. Louis, Mo., United States of America). The particle size was less than 10 microns. The graphite powder was exfoliated by a high power sonication treatment to achieve nanoscale graphene powder. The resulting powder was found to comprise nano and meso sized graphite sheets and platelets.

c. Carbon 60 Fullerenes

Carbon 60 ($C_{60}$) fullerene was purchased from SES Research (Houston, Tex., United States of America). $C_{60}$ fullerene comprises 60 carbon atoms aligned in a sphere made up of many carbon rings. Due to the shape and inherent nature of the $C_{60}$ sphere, incorporating them in composite materials can impart energy dissipation qualities. During the shockwave propagation, $C_{60}$ is put under an influx of pressure, and the spheres can respond by contracting and expanding with the pressure, allowing a great deal of the energy to be absorbed and dissipated. The $C_{60}$ have a mean sphere diameter of 68.3 nm and sphere outer diameter of 101.8 nm.

d. POSS

Methacrylate Isooctyl Polyhedral Oligomeric Silsesquioxane (POSS) was purchased from Hybrid Plastics, Inc (Hattiesburg, Miss., United States of America). As received, it was a clear colorless oil. The POSS molecule contains a basic polyhedral silicone-oxygen nanostructured skeleton cage structure. It may have 8 or 12 Si atoms surrounded by 8 or 12 organic groups. This particular POSS has 8 Si atoms located at the corners surrounded by 12 oxygen atoms. There are 7 individual iso-octyl groups bonded to Si for compatibility and a polymerizable methacrylate functional group for interaction with polymers and surfaces.

e. Tungsten Disulfide Nanotubes

Tungsten disulfide multi-wall nanotubes (INTs) were purchased from ApNano Materials, Inc. (New York, N.Y., United States of America). They are needle-like particles with a large aspect ratio (width:length=about 100:15) with mean outer diameter of about 100 nm and a length of about 15 nm. INTs can exhibit excellent shock absorbing properties and impact resistance. They can have resistance to shockwave pressures greater than 21 GPa.

Example 2

Ether and Ester Based TPU Screening: Melt Blowing

The TPU nonwoven webs were processed on the University of Tennessee Nonwovens Research Laboratory (UTNRL; Knoxville, Tenn., United States of America) horizontal six inch research melt blowing line. The processing line comprises a 4 zone single screw extruder (1.5 in. diameter and 33 in. screw length), positive-displacement 10 cc/rev Zenith (Monroe, N.C., United States of America) metering pump, an Ingersoll-Rand SSR-2000 (Piscataway, N.J., United States of America) air compressor, 2 air heaters in series, and a belt collector with vacuum. A 5.24 cm (6 in.) Exxon (Baytown, Tex., United States of America) style die with a 60° nose angle, 20 holes/in at 0.457 mm (0.018 in.) diameter, and die setback and air gap of 1.52 mm (0.06 in.) was used in processing. Prior to processing, all polymers were dried at 105° C. in a Conair Compu-Air humidifying dryer (Franklin, Pa., United States of America) for 3 to 4 hours to achieve moisture content below 0.02%. Starting temperatures of the process were determined by analysis of DSC and MFR results. In melt blowing, it is desirable to start at temperatures relatively close to optimal processing temperatures to avoid die clogging. Clogged die orifices create webs with poor web quality and consequently, the system must be shut down to remove the clogged die for burn out procedures. Once the process was begun, the extrusion temperatures were adjusted to maintain die pressures in the range of about 300 to about 500 psi (about 2068 to about 3447 kPa) and allow equal comparison of the processed web properties. Air temperatures were adjusted in accord with die temperature. The process conditions for each polymer are shown in Table 2. The polymer throughput was maintained between about 0.67 to about 0.68 g/hole/min and the collector speed was adjusted between 8.5-8.7 m/min to produce melt blown microfiber webs of 80 g/m². The webs were collected at die-to-collector distances (DCDs) of 20, 30, and 50 cm and at air pressures of about 20 and about 25 psi (about 137 to about 172 kPa) to give a good representation of the effects of DCD and air pressure (comparable to air flow rate) on the web properties.

TABLE 2

TPU Melt Blowing Conditions

| Polymer | ID | Extruder Temp. (° C.) | M.P. Temp. (° C.) | Die Temp. (° C.) | Air Temp. (° C.) |
|---|---|---|---|---|---|
| 55DT3 | T55D | 215, 260, 255, 245 | 230 | 230 | 250 |
| 58219 | T92A | 205, 220, 230, 230 | 230 | 225 | 238 |
| 58315 | T85A | 200, 230, 230, 225 | 240 | 220 | 225 |
| 60DS3 | S55D | 215, 245, 240, 245 | 255 | 245 | 250 |
| 58277 | S92A | 205, 225, 230, 230 | 230 | 230 | 235 |
| 58271 | S85A | 180, 190, 200, 200 | 210 | 190 | 190 |

Example 3

Ether and Ester Based TPU Screening: Results-Determination of Process Parameters DSC scans and melt flow rates were used to determine starting melt blowing process temperatures for the extruder, metering pump, die, and air temperature. For melt processes, the highest endotherm is of importance to determine the melting point of the polymer. All polymers were found to have broad melting peaks, indicating a range of crystal sizes, and the T55D and T85A both have dual melting peaks. As a rule of thumb in melt blowing, setting the die to 30° C. above the highest melting temperature is a good starting point for polymers which there is no previous experience or knowledge of melt processing behavior. The orifices of melt blowing dies are very small compared to other melt processing dies and can become clogged very easily and thus causing necessary shutdown of the process. Being 30° C. above the highest melting point is typically high enough to avoid this while remaining in a reasonable temperature range to avoid polymer degradation.

Other than zone 1 of the extruder, other processing temperatures should desirably be set to at least 10° C. above the highest polymer melting temperature. The melt flow rate of the polymers can be used to give an idea of how to set these processing temperatures. As expected, the MFR of all the polymers increases with increasing temperature. The ether and ester soft segment based TPUs both showed a change in slope at the 220° C. temperature, indicating a shear thinning behavior. This rheological behavior is useful in melt processing, as it alleviates torque on the extruder screw and lowers processing pressure. It was also observed that MFR increases with decreasing polymer shore hardness (decreasing hard segment content). However, the 85A polymers show lower melt flow rates than the 92A polymers at high temperatures. This is due to a greater contribution of the viscous effect of the higher soft segment content compared to the elastic effect of the hard segments to the melt flow rate or viscosity.

These characterizations give an indication of starting temperatures which will allow melt processing to begin without problems. Final melting temperatures can be adjusted once the process has stabilized and extruder torque and pressure and die pressure can be taken into account. The final processing temperatures of the screening polymers were presented in Table 3 (below) and were set to maintain processing pressures between 300 and 500 psi. This was done to minimize differences on processing effects on the nonwoven web properties.

Example 4

Ether and Ester Based TPU Screening: Nonwoven Web Characterizations and TPU Processing Observations Web quality varied greatly with different air pressures and DCDs. At an air pressure of 20 psi, the 85A polymers exhibited poor fiber formation at the 20 cm DCD but improved with increasing DCD. The S85A webs could not be collected due to considerable shrinkage down to approximately 2 to 3 inch width and wrinkling. The webs which were collected averaged approximately 6 inches. Though webs quench at a much faster rate during melt blowing than the 10 degree per minute rate used in the DSC, the curves remain useful in analyzing the crystallization kinetics of polymers during melt blowing. All polymers show crystallization on cooling except the S85A indicating there could be problems during collection of nonwoven webs of this polymer.

The extruder overheated periodically during processing of the shore hardness D polymers. To compensate, the first heating zone of the extruder was increased to much higher temperatures above the polymer melting temperatures. This did alleviate the overheating issues however the hopper feed throat would clog over time if not agitated due to premature melting of the pellets. High air temperatures were also required to form quality webs of the shore hardness D polymers. This may be significant in industry as air heating is the most expensive component of the process. No issues were experienced with processing the 92A shore hardness TPUs.

Example 5

Ether and Ester Based TPU Screening: Intrinsic Viscosity

Polymer and web intrinsic viscosity (IV) values are tabulated in Table 3. A loss of intrinsic viscosity was expected during melt extrusion processing due to chain scission. Also, thermoplastic polyurethanes can undergo urethane dissociation at temperatures above 130° C. leading to additional loss in molecular weight. The shore hardness D webs lost more than 50% of the polymer intrinsic viscosity due to the very high temperatures necessary to prevent extruder overheating. The S92A web also lost a considerable amount of IV at 48%. The T92A and T85A webs both lost less than 40% IV. Melt blowing was expected to result in IV losses in polypropylene and polyesters around 30%. The higher losses here were attributed to the urethane bond dissociation. The intrinsic viscosity losses here were much lower than those published by Zapletalova (Zapletalova, 2006) which lost between 75 to 80%. Those TPUs were processed at temperatures greater than 260° C. while the highest processing temperature here was 245° C.

TABLE 3

TPU pellet and web intrinsic viscosity.

| Polymer | Intrinsic Viscosity (dL/g) | | % Δ [η] |
|---|---|---|---|
| | Pellet | Web | |
| T55D | 1.46 | 0.72 | 50.7 |
| T92A | 1.05 | 0.64 | 39.0 |
| T85A | 0.9 | 0.58 | 35.6 |
| S60D | 1.84 | 0.835 | 54.6 |
| S92A | 1.02 | 0.53 | 48.0 |
| S85A | 0.96 | — | — |

Example 6

Ether and Ester Based TPU Screening: SEM Imaging

Scanning electron microscope image of webs processed with 25 psi air pressure at 20, 30 and 50 cm DCD were taken. Fibers showed increasing entanglement and roping with increasing DCD with the degree of entanglement increasing as TPU MFR increases in respect to the corresponding shore hardness of the polymer. The 92A shore hardness polymers had the highest MFR and consequently a higher degree of roping in the webs as the fibers are less stable in the air field.

Example 7

Ether and Ester Based TPU Screening: Average Fiber Diameters and Distributions

The average fiber diameters for all of the webs produced (20 and 25 psi at 20, 30 and 50 cm DCD) were measured.

Overall, average fiber diameters of the webs produced ranged from 4.69 to 7.66 microns, a difference of 2.97 microns. No fiber diameters larger than 14 um were measured. Breese (Breese, 2003) and Lee (Lee, 2005; Lee, 2007) showed that fiber attenuation to smaller diameters occurs at distances less than 10 cm away from the die face where temperatures are great enough to overcome the molten fiber viscosity. Therefore, changes in average fiber diameter with DCD is not expected in these webs as they were collected at a 20 cm DCD and greater. The variations seen in average fiber diameter with increasing DCD seen here arose from the selection of fibers for measurement. The 25 psi were pressure produce webs with smaller average fiber diameter which is consistent with melt blowing theory concerning effect of air flow rate on fiber diameter. Without being bound by any particular theory or mechanism of action, the variation from theory for the T92A web at all DCDs and S60D at 30 cm DCD was likely due to the fibers chosen for measurement. The error overlap at each DCD/air pressure combination indicated a broad distribution of fiber diameters. This was further verified using fiber distribution plots.

Example 8

Ether and Ester Based TPU Screening: Break Force and Elongation

Break force and elongation at break as a function of DCD and air pressure behavior for samples cut in the machine (MD) were measured. Both break force and elongation at break were found to decrease with increasing DCD. This type of behavior is unusual in polymers which generally display increasing elongation with decreasing strength. To understand the behavior observed, it was necessary to understand how nonwoven strength develops during the melt blowing process.

The air temperature and velocity profiles of commercial style melt blown lines were investigated by Bresee (Bresee, 2004), Begenir (Begenir, 2009) and Lee (Lee, 1992). They found that both parameters decrease rapidly away from the die and plateau out around 15 to 20 cm. They all found fiber attenuation ceases when the air and fiber velocities are equal and the drag force on the fiber drops to zero. For the different melt blowing lines investigated, this point in which the air and fiber velocities equal was found to be less than 10 cm. At distances greater than 10 cm from the die, the fibers can be considered to be at nearly isothermal conditions. Lee (Lee, 1992) reported that their 240° C. air temperature dropped to 71° C. at 6 cm from the die followed by a decrease to 51° C. at 20 cm. They reported their air velocity as 60% of an open air valve and measured air speeds at multiple air distances with a pilot tube.

With the fibers being attenuated at high air temperatures near the melt temperature and high air velocities, little to no molecular orientation was obtained in the fiber. Therefore chain orientation had little effect on the strength of the web. Also, crystallinity of the web depends only on the polymer type and time the fiber spends in its crystallization temperature range. This was verified in this investigation as no crystallinity change was found with DSC scans for the same polymer species processed at the DCD's and air pressures investigated. Some small changes in crystallinity can be found when air pressures are drastically different however the upper range of air pressure necessary to invoke crystallinity changes is not economical from a cost standpoint as well as the resulting web is generally of non-uniform character. To change the web crystallinity, the die temperature should be altered with higher temperatures providing higher crystallinity.

Taking these aspects into account, web strength is thought to be dependent on the inherent polymer properties, the fiber orientation in the web, and inter-fiber bonding within the web. The inherent polymer properties explain the trend of decreasing strength and increasing elongation found with decreasing polymer hardness. Close observation of the SEM images from this study indicated very little change in fiber orientation at different DCD's for a constant air pressure. No difference in fiber orientation was readily observed for increasing air pressure as well. Observations did reveal however, greater fiber bundling and roping with increasing DCD. This leaves inter-fiber bonding as the final component. When the molten fiber exits the die, it begins attenuation and cooling immediately. When the crystallization temperature is reached, the fiber begins to solidify with complete crystallization and solidification typically occurring on the collection belt but before winding. The time it takes for the fiber to reach the collection belt and contact other fibers dictates the amount of inter-fiber adhesion within the web. At short DCD's, the fiber is still hot and tacky when it hits the fibers already on the collection belt. This allows for numerous inter-fiber adhesion sites in the web and therefore a stronger web. As the DCD is increased, the fibers have more time to cool resulting in a web with less inter-fiber adhesion and a weaker web. The effect of air pressure is that with increasing air pressure, the fiber travels at a faster rate to the collector and consequently is at a hotter temperature resulting in a stronger web. The small decrease in fiber diameter with the higher air pressure (25>20 psi) is assumed to not have much effect on the cooling rate of the fiber as crystallization kinetics observed in DSC scans did not reveal any changes.

Results of the studies disclosed herein demonstrated the dependence on DCD and air pressure for web strength in the ether based webs. Strength decreased with decreasing polymer hardness while elongation decreased with increasing polymer hardness. The degree of decrease from 20 to 30 cm was seen to decrease with decreasing polymer hardness as well. From 30 to 50 cm the loss of strength and elongation remained similar between the different TPUs. The ester results showed a lower degree of strength dependence on polymer hardness at higher DCD's. The T55D and S60D webs showed considerable less elongation properties compared to the softer webs. Overall, the ester based webs possessed greater strength at break while the ether based webs possessed greater elongation.

Example 9

Ether and Ester Based TPU Screening: Pore Size

The average pore size was found to increase with increasing DCD and decrease with higher processing air pressure. Increasing DCD causes an increase in pore size because fiber entanglement increases at larger DCD's resulting in reduced fiber cover in the web. At higher DCD's, the webs are cooler and therefore less fiber-to-fiber bonding occurs in the web. When air flow is increased, finer fibers are produced, creating a greater pore cover in the web. The fibers also travel faster and are at a higher temperature when they land on the collection belt allowing for more fiber-to-fiber bonding sites.

Most webs showed a large increase in pore size from 20 to 30 cm DCD and from 30 to 50 cm. The increase was to a lesser degree. The T55D web average pore size stayed relatively the same with the increase for 30 to 50 cm DCD. The T85A web processed at 20 psi showed the largest average pore size at 20 cm due to the poor fiber formation in the web. At 25 psi, the T85A web showed a decrease in average poor size from 20 to 30 cm DCD. At low DCD, the T85A polymer does not produce a high quality web as the fibers are not quenched and shrink resulting in a web with poor coverage. As the DCD is increased, the fibers have enough time to quench and form a higher quality web. It should also be noted that the standard deviation of the pore size increases with increasing DCD. This indicates that the range of poor sizes in the web increases at higher DCD's.

Example 10

Ether and Ester Based TPU Screening: Air Permeability

As expected after analysis of the average pore size, air permeability also increases with increasing DCD. Air permeability was also found to decrease with increasing air pressure. The T85A/20 web showed the highest air permeability due to the poor web formation. The T85A/25 data showed a similar shape as its pore size data.

Example 11

Ether and Ester Based TPU Screening: Dynamic Mechanical Analysis

DMA double log frequency scans for E' and E" moduli at room temperature of single webs were completed. Both moduli increased with increasing shore hardness. This was due to the ratio of hard versus soft segment content. Without being bound by any particular theory, the ester based webs showed higher moduli than their respective ether based webs at similar or equal hardness likely due to a higher degree of hydrogen bonding and phase mixing. Both moduli increased over the frequency range investigated which in some embodiments could improve dampening properties at higher strain rates.

Temperature scans at 10 and 100 Hz of 4 layer sandwich composites were completed. The webs were hot pressed at 90° C. for 90 seconds with 11 tons of pressure. The effect of shore hardness was clear in the storage modulus (E'), as E' increased with shore hardness. This was expected since higher hard segment content increases strength and also acts as a reinforcing filler dispersed in the soft matrix. The storage modulus dropped about two orders of magnitude over the temperatures range investigated. The glass plateau was extended and the temperature at which E' begins to drop from the glass plateau increased with increasing shore hardness. This was due to a more perfect hard domain structure attained with higher hard segment content. The onset of the plateau in the rubber region occurred at higher temperatures with increasing shore hardness was also due to the degree of order in the hard segment domain of the higher shore hardness polymers. The storage modulus increased to higher values from the 10 Hz scan to the 100 Hz scan, indicating increased viscoelastic properties at shorter time scale deformations.

The glass transition results from soft segment relaxation and is sensitive to the material composition. In these TPUs, the glass transition was found to increase with increasing shore hardness (increasing hard segment content). With increasing hard segment content, larger and more ordered hard microcrystalline domains were formed resulting in restricted the molecular motion of the soft segments.

From a soft segment point of view, an increase in soft segment length or molecular weight increases the TPUs degree of phase separation by the increase in incompatibility. The Tg decreases with decreasing shore hardness (higher soft segment content and higher molecular weight) as less energy is required for the material to undergo the phase transition from glass to rubber upon heating. This was verified in the activation energy calculations which are discussed later.

The Tg of the polyether based TPUs were found to be lower than that of the polyester based TPUs. Without being bound by any particular theory, this was due to the availability of C═O groups of each monomer in a polyester for possible hydrogen bonding with the N—H groups in the urethane hard segments. The higher degree of hydrogen bonding of polyester based TPUs lowers the free energy of mixing of the hard and soft segments that drives phase separation. The more flexible ether bond and higher free energy of mixing of polyether based TPUs allowed them to attain a higher degree of phase separation and thus the soft segments have greater mobility and require less energy to relax.

The activation energy of the TPU web glass transitions were calculated based on the dynamic mechanical analysis temperature scan of each 4 layer sandwich using the Arrhenius equation below:

$$f = A\exp\frac{-E_a}{RT_g}$$

The ether samples showed a trend of decreasing activation energy required to undergo the glass transition. The ester based webs did not show the expected trend as both have approximately the same activation energy. This was likely due to the high processing temperatures required for S60D which resulted in a large decrease in intrinsic viscosity of the S60D web which can be related to a high degree of molecular weight loss (shorter chain length are more mobile).

Glass transition temperatures as a function of frequency were calculated. The glass transition temperatures were determined from 1, 10, and 100 Hz. As stated previously, the Tg should be close to the expected use temperature in order to exploit the energy consumption of the rubber to glass phase transition at impact. The possible use temperature is dependent on the season and geographical region in which the material is used. To cover a broad temperature range, 20° to 35° C. (68° to 95° F.) was blocked off in a frequency range of 500 to 10,000 Hz. Strain rates ranging from $10^4$ to $10^6$ are typically experienced with high velocity ballistic impacts. The sacrificial armor (vest or helmet) will absorb much of that energy and the remaining strain of frequency of the propagating strain wave could range from 500 to $10^4$ Hz. Thus, it is reasonable to expect reductions in the strain induced by high velocity impact as some energy will be absorbed and dissipated by the sacrificial armor before it is passed to the underlying sandwich composite. The T92A sandwich composite was the only material in which the predicted Tg encompassed the region boxed off in the graph (FIG. 1) but only a small portion in the low frequency range.

Example 12

Ether and Ester Based TPU Screening Conclusions

The shore hardness D polymers were hard on the melt blowing equipment and required processing temperatures much higher than their melting temperatures to reduce the torque on the processing screw and prevent extruder overheating. Also the glass transition temperatures at 100 Hz (64° and about 55° C.) were higher than the expected use temperature (20 to 35° C.) for the application and the transition from rubber to glass upon impact would not be exploited.

The T85A polymer was somewhat difficult to process and due to the viscous nature of the higher soft segment content and low quenching (crystallization) temperature. The webs collected were very soft and flexible. It is likely that the lack of stiffness would cause difficulties in the coating experiments. The Tg was also too low for the intended application. The 92A shore hardness webs had good processability and the predicted Tg of the S92A in the high frequency range encompassed a small portion of the boxed area in FIG. 1. The T92A material showed poor damping and the Tg was not in a suitable range.

Taking these conclusions into account, it was decided to use an ether based TPU of 90A shore hardness. The chosen polymer and its properties are discussed in the following section.

Example 13

TPU Web for Nanofiller Reinforcing: Melt Blowing Method

From the melt blowing trial of 80 grams per square meter basis weight (areal weight) webs, it was determined by taking into account a combination of ease of processing, web properties, and characteristics (Tg) that a TPU with shore hardness between 85A and 92A would likely exhibit the qualities desired. Estane 58215 of 90A shore hardness was chosen for nanoparticle solution coating methods and melt blowing compounded TPU/C60 blends. It is referred to herein as T90A.

Webs of 100 g/m² basis weight were melt blown on the UTNRL six inch research line. The processing parameters are listed in Table 4. The webs were collected at a DCD of 40 cm with an air pressure of 35 psi. Die pressure was maintained at approximately 500 psi (3447 kPa) during processing. The throughput was maintained at 0.83 g/hole/min (ghm), marginally higher than the first melt blowing trial and comparable to commercial production rates. It should be noted that the throughput (0.67 to 0.68 g/hole/min) in the screening trial was limited to what was attainable for the shore hardness D polymer.

TABLE 4

Melt blowing conditions for TPU T90A shore hardness webs for nanofiller coating reinforcement.

| Extruder Temp. Zones (° C.) | Die Temp. (° C.) | Air Temp. (° C.) | Air Pressure (psi) | Throughput (g/hole/min) | Collector Speed (m/min) | Basis Wgt. (gsm) | DCD (cm) |
|---|---|---|---|---|---|---|---|
| 230, 260, 250, 230 | 230 | 260 | 35 | 0.83 | 5.2 | 100 | 40 |

Example 14

Nanofiller Reinforcing Strategies on Preformed Webs: Continuous Dip Coating

A Mathis Coating/Padder/Dryer was utilized in continuous dip coating of T90A webs of 30 gsm basis weight with Cloisite 30B nanoclay. The system consisted of 2 nip pressure rolls, drying oven with vacuum, and winding system with collection speeds ranging from 0.1 m/min to 2 m/min. Equations below were used to determine the solution concentration needed to achieve a specific loading of nanoclay.

$$\% \text{ wet pickup of web} = \frac{\text{wet } wgt}{\text{dry } wgt} * 100$$

$$\% \text{ concentration} = \frac{\% \text{ add on}}{\% \text{ wet pickup}}$$

Webs were loaded at 1, 3, and 5 wt % on the 30 g/m² (gsm) web by coating in concentrations of (0.0015), (0.0046) and (0.0077), respectively. The pentanol/30B solutions were sonicated at 42 kHz for 20 min prior to coating to break up the clay platelets and disperse the nanoclay evenly in the pentanol. The nanoclay/pentanol solutions were then transferred to an online sonicator and sonicated at 25 kHz during the coating process. This online sonicator was used to prevent settling of the nanoparticle in the solvent thereby allowing high dispersion in the microfiber webs at the desired add on weight percent. Table 5 presents the Mathis operation parameters used during the coating process. The % wet pick up for the 30 gsm TPU webs in pentanol was found to be 650%. Once the webs were run through the sonicating nanoclay/pentanol solution, they traveled through nip pressure rolls then the dryer followed by a final nip pressure and a winding roll for collection.

TABLE 5

Dip coating parameters for 30 gsm TPU preformed nonwoven webs in nanoclay/pentanol solution

| Parameters | 30B/Pentanol Solution |
|---|---|
| % Wet Pick-up | 650 |
| Web Run | 1.5 m/min |
| Nip Pressure | 0.75 bar |
| Dryer Temperature | 130° C. |
| Dwell Time | 36 sec |

Example 15

Nanofiller Reinforcing Strategies on Preformed Webs: Individual Dip Coating

Cloisite 30B and carbon-60 fullerene were used in single dip coating 2.5×2.5 in. samples of 100 gsm T90A nonwoven webs. Solutions of nanoclay 30B/pentanol and $C_{60}$/toluene were prepared for 1, 3 and 5% loading of the nanofillers. The mass of each 2.5×2.5 in. sample was recorded, and the appropriate mass of nanofiller to achieve the desired add on wt % was weighed out and added to 25 mL of the corresponding solvent. The clay solution was sonicated at 42 kHz for 20 min and the fullerene solutions were sonicated for 5 min at the same frequency. The 25 mL nanofiller solutions were then poured into a petri dish and allowed to spread evenly. The webs were then carefully placed in the dish and allowed to absorb the solution. The samples were then dried overnight in a chemical hood to allow for complete evaporation of the solvent.

Example 16

Nanofiller Reinforcing Strategies on Preformed Webs: Continuous Ultrasonic Spray Coating A Wide-Track ultra-sonicating spray system was purchased from Sono-Tek Corporation (Milton, N.Y., United States of America). The system was equipped with a 25 Hz stainless steel non-clogging ultrasonic nozzle capable of producing droplet sizes averaging about 55 um. The atomization of the solvent and nanofiller allowed for precise control of coating at a specified flow rate, providing for a more uniform dispersion of the nanofiller. Spray widths ranged from about 2 to about 24 inches. The spray system was used in conjunction with a Mathis Coater/Padder/Dryer machine (Concord, N.C., United States of America) to enable continuous spraying and online drying of the webs after spraying.

As their name implies, ultrasonic nozzles employ high frequency sound waves, those beyond the range of human hearing. The sound waves were created by disc-shaped ceramic piezoelectric transducers which convert electrical energy into mechanical energy. The transducers received electrical input in the form of a high frequency signal from a power generator and convert that into vibratory motion at the same frequency. Two titanium cylinders magnified the motion and increased the vibration amplitude at the atomizing surface. Nozzles were configured such that excitation of the piezoelectric crystals created a transverse standing wave along the length of the nozzle. The ultrasonic energy originating from the crystals located in the large diameter of the nozzle body underwent a step transition and amplification as the standing wave traversed the length of the nozzle. The air delivery system was composed of two air jets. They alternated on and off to create a sweeping spray pattern which was uniform and highly repeatable. The operation parameters of the system were determined by simultaneously solving the equations below.

$$\text{Nanoparticle Feed Rate} = \frac{\text{Volume Flow Rate}}{\text{Solution Concentration}}$$

$$\text{Fabric Areal Feed Rate} = \frac{\text{Deposition Width}}{\text{Belt Speed}}$$

$$\text{Nanoparticle Deposition Density} = \frac{\text{Nanoparticle Feed Rate}}{\text{Fabric Areal Feed Rate}}$$

$$\text{Nanoparticle add on wgt \%} = \frac{\text{Nanoparticle Deposition Density}}{\text{Fabric Basis } Wgt}$$

Two nanofiller solutions spraying trials with different parameter constants were performed and carried out as follows.

Trial 1

For Trial 1, the nanoparticle solution concentration was kept constant while the volume flow rate (VFR) and belt speed (BS) were varied in order to achieve the desired add on wt % of the respective nanoparticles. The webs were sprayed on both sides, half of the desired add on wt % per side, to achieve totals of 1, 3 and 5 add on wt %. The process parameters are listed in Tables 6 and 7 for $C_{60}$ and POSS nanofillers, respectively, dispersed in toluene. Prior to spraying, the solutions were sonicated at 42 kHz for 30 min. The drying oven was set at 65° C.

TABLE 6

$C_{60}$ spray parameters.
$C_{60}$/Toluene [2.735 mg/ml] concentration

| Total add on wt % | Add on wt % per side | Flow Rate (ml/min) | Belt Speed (m/min) |
| --- | --- | --- | --- |
| 1 | 0.5 | 27.8 | 1 |
| 3 | 1.5 | 35 | 0.418 |
| 5 | 2.5 | 40 | 0.287 |

TABLE 7

POSS spray parameters.
POSS/Toluene [4 mg/ml] concentration

| Total add on wt % | Add on wt % per side | Flow Rate (ml/min) | Belt Speed (m/min) |
| --- | --- | --- | --- |
| 1 | 0.5 | 25 | 1 |
| 3 | 1.5 | 30 | 0.525 |
| 5 | 2.5 | 35 | 0.367 |

Trial 2

From Trial 1 observations, it was determined that the spray system produced the best nanoparticle dispersion between about 25 to about 30 ml/min flow rates with belt speed close to 0.5 m/min. For Trial 2, the VFR and belt speed were kept constant while the solution concentration was altered to achieve the desired add on wt % of the respective nanoparticles. The parameters for Trial 2 are detailed in Table 8. The nanofillers sprayed include fullerene $C_{60}$, graphite, and inorganic tungsten disulfide nanotubes (INTs). The $C_{60}$ and graphite were dispersed in toluene while the tungsten disulfide INTs were dispersed in ethanol with 15% Wetter D-75E surfactant to aid in keeping the particles in solution. The solutions were sonicated for 30 min at 42 kHz prior to spraying. Unlike Trial 1, Trial 2 solutions were also sonicated at 25 kHz during the spraying process to prevent settling of the nanoparticles while in the spray system reservoir.

TABLE 8

Spray parameters for Trail 2: $C_{60}$, Graphite, and INT.

| Nanomaterial/ Solvent | Concentration (mg/ml) for target add on wt % | | | Operation Parameters | |
| --- | --- | --- | --- | --- | --- |
| | 0.20% | 0.60% | 1% | VFR (ml/min) | BS (m/min) |
| $C_{60}$/Toluene | 0.610 | 1.83 | 3.05 | 25 | 0.5 |
| Graphite/Toluene | 0.4064 | 1.219 | 2.032 | 30 | 0.4 |
| INT/Ethanol/ 15% Wetter D-75E | 0.6096 | 1.829 | 3.048 | 25 | 0.5 |

Example 17

Nanofiller Reinforcing Strategies on Preformed Webs: Results

Estane 58215 ether based 90A shore hardness TPU was used for reinforcement with nanoparticles. The web was collected at a DCD of 40 cm with 30 psi air pressure. No issues were experienced during melt blowing. Intrinsic viscosity was found to decrease from 1.35 to 0.8 dL/g, a loss of 40%. This is comparable to the previous intrinsic viscosity results for the screening TPUs.

The web properties and characteristics are listed in Table 9. The webs were collected at 100 gsm basis weight. The average fiber diameter was 4.2 um. This was actually slightly lower than the 80 gsm webs averaged (4.7 to 7.7 um) despite a higher throughput (0.83>0.67 ghm). The smaller fiber diameter is attributed to the higher air pressure (35 psi) utilized for this web. This high strength and elongation at break suggest a web with high toughness suitable for energy absorption and dissipation.

TABLE 9

T90A web properties.

| Method | Sample Avg. (std. dev) |
|---|---|
| Basis Weight (gsm) | 100 |
| Fiber Diameter (μm) | 4.2 (1.4) |
| Thickness (mm) | 0.47 |
| Air Permeability (ft$^3$/min/ft$^2$) | 1100 |
| Modulus (psi) Machine/Transverse | 58/13.2 |
| Break Stress (psi) | 790 |
| Break Elongation (%) | 330 |

Figure 2:
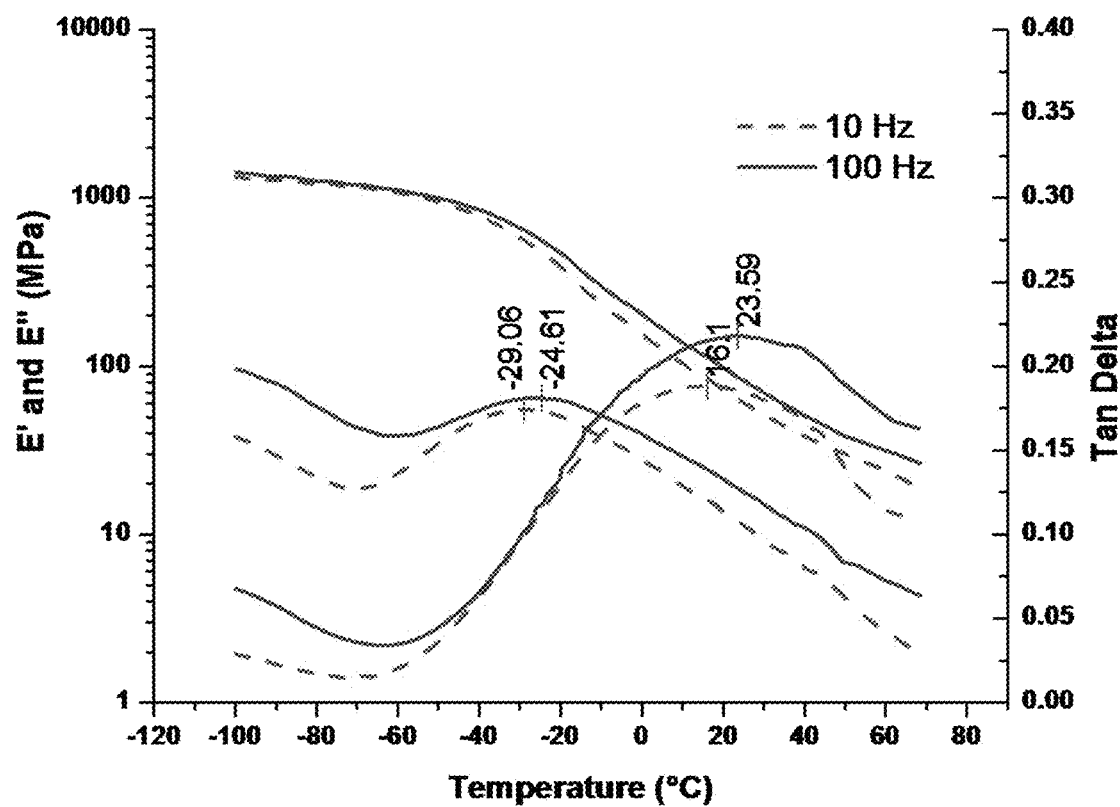
FIG. 2 is graph depicting the results of a dynamic mechanical analysis (DMA) temperature scan of a T90A 4 layer sandwich composite. Legend: 10 Hz, dashed lines; 100 Hz, solid line.

FIG. 2 shows a DMA temperature scan of the T90A 4 layer sandwich composite. Peak temperatures for E" and tan delta are labeled and show shifts to higher temperatures with the increase in frequency for 10 to 100 Hz. The E' at low temperature doesn't show improvement with increasing frequency however, E" does therefore tan delta in also increased. At higher temperatures, E" shows a larger improvement with increased frequency and therefore the tan delta at 100 Hz has an increased magnitude over the 10 Hz peak.

Figure 3:
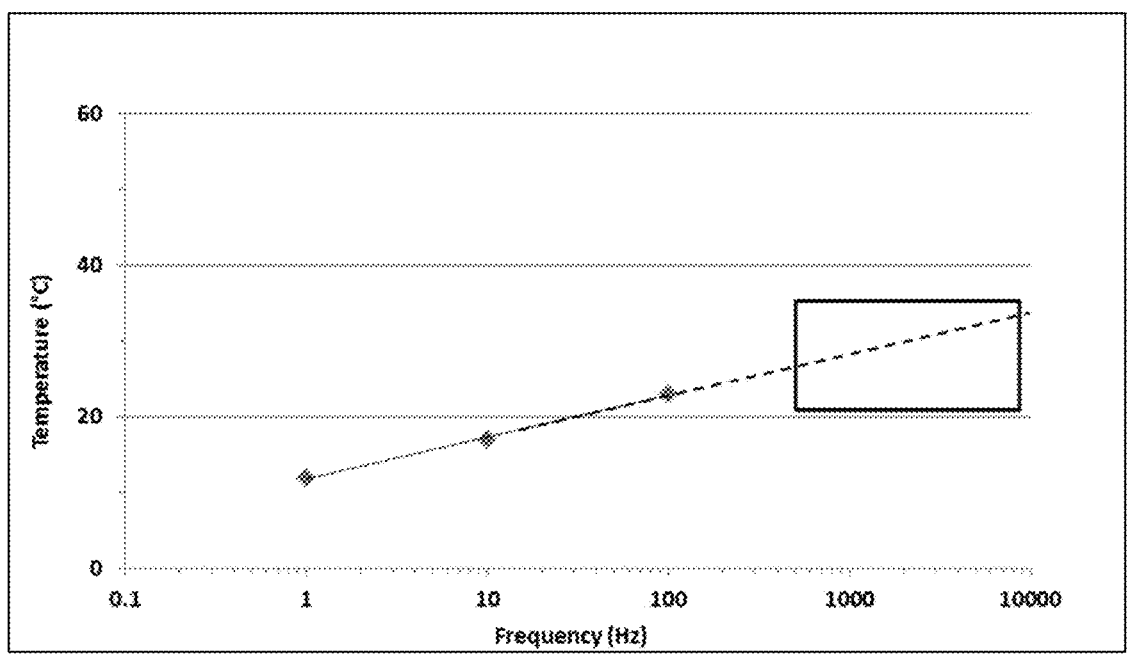
FIG. 3 is graph depicting the prediction of Tg for T90A at high frequencies.

FIG. 3 shows the glass transition temperatures taken from the tan delta peaks at 1, 10 and 100 Hz as a function of frequency. The solid line represents the best fit of the three data points. The dashed line which represents the possible Tg at higher frequencies passes through a good portion of the boxed area for representative use temperatures and possible frequencies of strain the material may be under after impact.

DMA temperature scans and analysis of glass transition temperatures indicate that the T90A material will undergo the phase transition from rubber to glass at impact.

DSC scans of the unprocessed polymer and web were taken. A low temperature and high temperature endotherm were observed in both scans with both endotherms showed and increase in peak temperature in the web over the polymer. The 1$^{st}$ endotherm increases from 83° C. in the polymer to 102° C. in the web. This endotherm could originate from a number of thermal transitions and will be further discussed in the following section. The web T$_m$ is increased to 185° C. from 159° C. of the polymer. This was likely due to polymer chain orientation in the fiber and higher degree of crystallinity in the web as ΔH increased from 25 J/g for the polymer to 27 J/g in the web.

Based on a cooling curve the web has faster crystallization kinetics. The web crystallized at a much higher temperature of 154° C. while the polymer crystallizes at 98° C. The enthalpy (ΔH) also increased from 8.7 J/g in the polymer to 13.7 J/g in the web. These increases were likely due to chain scission during processing with the shorter chains acting as nucleating agents and allowing greater mobility due to a shorter length which enabling them to diffuse in the melt and aggregate to form crystalline hard domains.

DSC thermograms of the annealed webs with a control web were collected and analyzed. T90A webs were annealed at 90° C. and 130° C. for 4 hours. In the 90° C. annealed thermogram, the first endotherm had shifted up 8° to 110° C. from 102° C. in the melt quenched web. No increases in enthalpy (ΔH=8 J/g) were found. The second endotherm maintained its shape and peak melting temperature, however a 1 J/g increase in ΔH was observed. In the 130° annealed web, the first endotherm had shifted up to and merged with the second endotherm. Consequently, the enthalpy of the second endotherm increased to 35 J/g from 27 J/g in the melt quenched web. The increase in enthalpy of 8 J/g was the amount of enthalpy the first endotherm showed for both the melt quenched web and the 90° C. annealed sample. The high end of the second endotherm had also changed shape with an additional peak appearing at a temperature slightly lower than the labeled 185° C. peak. There was no change in the endset melting temperature.

The complex thermal behavior of TPUs is known. In general, two or three distinct endotherms can be observed in TPU DSC experiments. Polyurethanes which have a composition ratio of approximately 50% or lower by weight of hard segments have a discrete hard segment domain and show two endothermic peaks on heating above the melting temperature. Polyurethanes which contain greater than 50% by weight hard segments have a continuous hard segment domain and show three endothermic peaks with the highest appearing at temperatures of 200° C. and above.

The TPUs in this study all have two endothermic peaks which are below 200° C. and therefore, as expected, all are composed of less than 50% by weigh hard segments.

Early studies attributed the multiple endothermic behavior at temperatures below the microcrystalline melting endotherm to either hydrogen bond distribution effects or to two types of hydrogen bonds. This was later proven incorrect as polyurethanes incapable of hydrogen bonding were found to show the low temperature endothermic peaks as well. Other researchers have attributed the low temperature endotherms to intradomain ordering, the glass transition of the hard segment, and enthalpic relaxations. The Koberstein-Stein (Koberstein, 1986) model was proposed for polyurethanes which exhibit three endotherms. They indicate the first endotherm is found approximately 20° above the annealing temperature and is attributed to local reorganization of the hard domains and can be improved by annealing. They explained this by solubility effects for which there is a critical hard segment sequence length below which hard segments dissolve within the soft microphase. At low annealing temperatures, short and long hard segments separate from the soft microphase. At low annealing temperatures, long hard segments have limited mobility and only short segments can align to form ordered structures. As annealing temperatures increase, shorter hard segments become soluble in the soft microphases and the ordering process is due to progressively longer hard segments and the $1^{st}$ endotherm eventually merges with the second endotherm. The second endotherm observed between 140-200° C. was attributed to intersegmental mixing of non-crystalline hard and soft segments. They called this the Microphase Separation Transition (MST). The final endotherm observed at temperatures of 200° C. and greater was attributed to a combination of an order-disorder transition and microcrystalline domain melting in the hard segment rich phase. Their model is widely accepted for polyurethanes which show 3 endotherms.

Seymour (Seymour, 1973) proposed a theory for TPUs exhibiting two endotherms. For the first endotherm, like Koberstein, he found the first endotherm could be improved by annealing resulting in an increase in the peak temperature with increasing temperature and time up to a point in which it merged with the higher endotherm. They concluded that the first endotherm represents disruption of short range order of short poorly ordered hard segments within the hard microdomain. The second endotherm was attributed to disruption of long range order and melting of the microcrystalline domains. This theory supports the observed changes T90A thermograms.

Example 18

TPU/$C_{60}$ Compounded Blends: Melt Blowing

The $C_{60}$/TPU masterbatch was prepared at 0.5 wt % loading (4 kg TPU pellets, 20 g $C_{60}$). In an attempt to increase $C_{60}$ nanoparticle dispersion in the compounded masterbatch, a unique spray coating method was developed utilizing nickel plated aluminum and steel air atomizing sprayers purchased at McMaster-Carr (need company city, state, United States of America). The TPU pellets were divided into four 1 kg batches and spread evenly into 20×14×2 in baking pans. The $C_{60}$ nanoparticles, in four 5 g batches, were dispersed into four 1 L volumes of toluene, a concentration of 5 mg/mL. The individual volumes were put under magnetic stir for 5 min followed by sonication treatment at 42 kHz for 30 min before filling the 32 oz steel air atomizing sprayer. The sprayer was shaken periodically during spraying to maintain dispersion of the particles in the solution. Each TPU batch was sprayed with 1 L of $C_{60}$/toluene solution. Prior to spraying the $C_{60}$/toluene solution, DMF was misted onto the pellets followed by mixing to cover the entire pellet surface. The pellets were then allowed to sit for 5 minutes to allow for swelling of the pellet surface. This allowed the $C_{60}$ nanoparticles to be absorbed into the outer layers of the individual pellets once dried. The process was repeated 4 times to attain the desired 0.5 wt % loading. The 4 kg of $C_{60}$ spray coated pellets were allowed to air dry for 1 week with periodic mixing under a laboratory vacuum hood.

The coated pellets were dried at 105° C. in a Compu-Air humidifying dryer for 3-4 hr to achieve a moisture content below 0.02% and remove all toluene. The dried resin was sealed in an air tight bag until compounding. The compounding of the master batch was performed at Techmer PM (Clinton, Tenn., United States of America). Briefly, the dried $C_{60}$ sprayed pellets were fed through a twin screw extruder and the extruded filament was quenched in a water bath and then pelletized. Out of the initial 4 kg, 2270 g was returned.

The 0.5 wt % $C_{60}$/TPU masterbatch was further diluted down to 0.1 and 0.3 wt % by mixing with neat polymer then melt blown into microfiber nonwoven webs of 100 g/m² basis weight. UTNRL's six inch research line was used again. For this melt blowing trial, the metering pump was removed as a precaution to avoid system clogging and particle agglomeration. A 5.24 cm (6 in.) Exxon style die with a 60° nose angle, 7.87 holes/cm (20 holes/in) at 0.635 mm (0.025 in) diameter, and die setback and air gap of 1.52 mm (0.06 in) was used in processing.

The processing parameters for the TPU/$C_{60}$ blends and control webs are presented in Table 10. Loaded $C_{60}$/TPU webs of 0.1 and 0.3 wt % along with neat TPU webs for controls were all processed at the same temperature and throughput parameters. The screw speed had to be increased from 16 rpm for the neat samples to 18 rpm for the loaded webs in order to maintain throughput (0.55 ghm) throughout the trial. Despite this, the die pressure in the extruder remained between 130 and 150 throughout processing. Collection speed was maintained at 4.36 m/min to produce webs of 100 g/m² basis weight. Webs were collected at DCDs of 20, 30, and 40 cm to investigate nonwoven properties of the 0.1 wt % and neat materials. The 0.3 wt % batch was only collected at a DCD of 30 cm due to lack of compounded polymer. It was found that high quality webs could only be obtained at a narrow air pressure range, 16 to 19 psi, thus a pressure of 19 psi was utilized in this study.

TABLE 10

Melt Blowing parameters for compounded TPU/$C_{60}$ blends and control (neat) samples.

| Extruder Temp. Zones (° C.) | Die Temp. (° C.) | Air Temp. (° C.) | Air Pressure (psi) | Throughput (g/hole/min) | Collector Speed (m/min) | Basis Wgt. (gsm) |
|---|---|---|---|---|---|---|
| 220, 240, 230, 230 | 220 | 274 | 19 | 0.55 | 4.36 | 100 |

Example 19

TPU/$C_{60}$ Compounded Blends: Results

No change in the peak temperatures of the $1^{st}$ and $2^{nd}$ endotherms in the neat and 0.1% $C_{60}$ webs were observed. The $1^{st}$ endotherm peak temperature of the 0.3% $C_{60}$ web decreased to 91° C. Using the theory by Seymour for occurrence of the $1^{st}$ endotherm, this indicated that the greater concentration of $C_{60}$ created a higher degree of disorder of shorter hard segments in the hard domain. The enthalpy of the $2^{nd}$ endotherm decreased with increasing concentration of $C_{60}$ indicating the $C_{60}$ inhibited the amount of crystallinity obtained in the webs. As with the $1^{st}$ endotherm, the $C_{60}$ created a higher degree of disorder, preventing the hard segments from aligning and crystallizing into microcrystalline domains. The cooling curves showed very little change in the crystallization kinetics.

Example 20

TPU/$C_{60}$ Compounded Blends: SEM Imaging

Scanning electron images were taken of the neat and TPU/$C_{60}$ at 0.1% wt loading collected at 20, 30 and 40 cm die-to-collector distances. The degree of fiber entanglement and roping in the webs was observed to increase with increasing DCD. Total fiber adhesion was observed to occur to a greater extent in the TPU/$C_{60}$ at 0.1% wt loading at 40 cm DCD compared to the neat webs.

The $C_{60}$ was clearly observed embedded in the surface of the 0.1% wt webs but not the 0.3% wt webs. Close examination of the 0.3% wt web images showed the fibers are larger and there was a much greater degree of total fiber-to-fiber adhesion. This could be due to differences in the rheological properties of the resins with addition of $C_{60}$ nanoparticles at different loadings. With larger fiber diameters, it is possible that the $C_{60}$ was able to remain embedded in the fibers.

Example 21

TPU/$C_{60}$ Compounded Blends: Fiber Diameter and Distribution

The average fiber diameters of the webs collected at increasing DCDs were measured. The average fiber diameter increased with increased $C_{60}$ loading. The control webs showed a slight decrease in average fiber diameter with increasing DCD from 5.3 um at 20 cm to 3.9 um at 40 cm. This was likely due to the fibers chosen for measurement as it is known that DCD has little to no effect on fiber diameter past 10 cm. Fibers which showed adhesion to other fibers were not measured and there was a greater degree of total fiber adhesion with increasing DCD leaving fewer fibers to measure. Air turbulence in melt blowing becomes uneven with increasing distance from the die and fibers come into contact with neighboring fibers and consequently adhere to one another. The TPU/$C_{60}$ webs at 0.1% wt loading maintain an average fiber diameter of about 6.5 um with increasing DCD while the 0.3% wt loaded web had an average fiber diameter of about 7 um. The error (standard deviation) was also observed to increase with $C_{60}$ loading. The control webs showed a decreasing distribution as the DCD was increased. The TPU/$C_{60}$ webs with 0.1% wt loading showed a larger distribution but the web collected at 30 cm DCD showed optimal collection with the narrowest distribution at that loading. The TPU/$C_{60}$ web a 0.3% wt loading showed a large distribution with fiber diameters up to 18 um measured.

Example 22

TPU/$C_{60}$ Compounded Blends: Break Strength and Elongation

Break strength and elongation as a function of DCD were determined. Break strength decreased with increased $C_{60}$ loading. The web strength is approximately equal with increasing DCD from 10 to 30 cm DCD. With further increase to 40 cm the neat and 0.1% webs show approximately equal drops in strength. A discussed previously, this is due to a lower degree of fiber-to-fiber bonding. The elongation at break increased with $C_{60}$ loading however the 0.3% fell between the neat and 0.1% $C_{60}$ webs.

Typically, addition of high modulus nanoparticle to polymers increases their strength and decreases the elongation properties. The opposite effects were observed in these materials. Without being bound by any particular theory, this was likely due to the fact that nonwoven mechanical properties are dominated by the web properties involving fiber-to-fiber bonding, entanglements, and roping. However, as was observed, these webs crystallized at approximately the same temperature so they should have approximately the same degree of fiber-to-fiber contacts at the respective DCDs. Therefore, without being bound by any particular theory, it is likely that the differences in the mechanical properties are due to the degree of fiber entanglement, roping and fiber diameter. Fibers with smaller diameter have greater strength than larger fibers. Here, it was observed that fiber diameter in these webs increased with increased $C_{60}$ loading.

Example 23

TPU/$C_{60}$ Compounded Blends: Pore Size

The average pore diameter was found to show a large increase with loading of $C_{60}$. The neat and 0.1% samples show similar trends with increasing DCD. There was little change in average pore diameter from 20 to 30 cm DCD and an increase in diameter at the 50 cm DCD was due to a high degree of total fiber adhesion.

Example 24

TPU/$C_{60}$ Compounded Blends: Air Permeability and Pore Size

As expected after analysis of the average pore sizes, the loaded samples had higher permeability values. The permeability of the 0.1% showed a steeper increase with increasing DCD compared to the neat samples. The 0.3% showed a much larger increase in air permeability when compared to the average pore size increase from 0.1% to 0.3% $C_{60}$. This indicated a broader distribution of pore sizes with larger pores having a greater influence on the air permeability.

Example 25

Sandwich Composite Fabrication: Methods

Sandwich nanocomposites were fabricated with a Carver hot press. The webs were all stacked in 0-90° with respect of the machine direction orientations and covered in a Kapton sleeve. Appropriate temperature, time, and pressure parameters were determined by investigation of different combinations of the three parameters with a goal of obtaining complete and durable adhesion while maintaining the fibrous structure of the webs. Choosing the appropriate parameters was done by visual examination for uneven melting, delamination, and DMA testing. The pressing parameters are reported in more detail herein.

Example 26

Sandwich Composite Fabrication: Continuous Dip Coating

SEM images were taken of continuously coated Estane/30B webs of 1 and 5%. It was observed that the 5% sample contained more nanoclay than the 1%. This was observed in numerous samples. The dispersion of the clay however was not uniform. While some smaller clay particles were seen, most were agglomerated in patches spread about.

The 30 gsm webs were hot pressed into 16 layer sandwiches with 115° C. heat at 120 seconds under 11 tons of pressure. Both E' and E" were reduced with loading of nanoclay. It was noticed during the coating process that the webs were heavily saturated with solvent. With this heavy saturation, the dryer had to be set at 130° C. to dry the webs before winding. The combination heavy solvent saturation and high drying conditions was believed to be the cause for the observed decreases in E' and E". The poor nanoclay dispersion was likely to have also contributed to the observed decrease.

Example 27

Sandwich Composite Fabrication: Individual Dip Coating

DMA scans were taken of the Cloisite 30B nanoclay single coated webs. These 100 gsm webs were hot pressed into 4 layer sandwiches at a temperature of 90° C. for 55 seconds and 11 tons of pressure. A slight increase for the 5% loaded sample was observed while the 3% and 1% loaded sandwiches decreased. The 1% loaded sandwich showed an extremely large decrease. E" showed an increase with 3% and 5% loadings.

DMA results of the frequency sweeps on the $C_{60}$ 4 layer single coated sandwiches were assessed. These sandwiches were pressed under the same conditions as the 4 layer nanoclay coated sandwiches. No increase in E' or E" was observed. Aggregation and agglomeration was evident and likely the cause of decreased E' and E". The degree of aggregation and agglomeration increases with increased loading.

Example 28

Sandwich Composite Fabrication: Continuous Ultrasonic Spray Coating

Trial 1

SEM images of the webs from Trial 1 were taken. As the POSS is a clear gel at room temperature, it is difficult to see on the fiber surface. The $C_{60}$ webs showed even dispersion but the fillers formed small aggregates. Aggregation increased with increased 60 loading.

The 4 layer sandwich composites were hot pressed at 90° C. for 55 seconds with 11 tons of pressure. All weight percentages showed clear improvement in E' and E" over the control sample with the 1% having the largest increase and 5% the least. The POSS samples show the 5 wt % giving a small improvement in E" while E' is reduced with POSS loading. Overall, the 1% $C_{60}$ showed the largest increase over the control with E'=about 90 MPa at 100 rad/s from about 30 MPa. Some delamination was visible in the samples after testing. This could have generated lower values for E' and E" therefore Trial 2 samples were pressed at longer times and temperatures. Also, observation of the process and SEM images indicated the spray system optimal volume flow rate ranged between 20 and 30 ml/min with belt speed at approximately 0.5 m/min.

Trial 2

The dispersion of the $C_{60}$ was much better than that in Trial 1 though some 2 to 4 micron aggregates were found in random patches with increasing add on percent. The graphite webs showed excellent dispersion with only a few very small aggregates visible. The INT's also had good dispersion with very few aggregates. The surfactant was also seen as a film connecting adjacent fibers. This may have limited the degree to which E' and E" increased with addition of the INTs. The INTs have the greatest strength of all the nanofillers used in this research and consequently it was expected they would have given the greatest increase in moduli, especially with the good dispersion observed in the SEM images. In SEM images of the top layer, $3^{rd}$ layer, and cross-sections of the $C_{60}$ and graphite sandwich composites, it was clearly that the fiber structure was maintained with the hot pressing for sandwich composite fabrication.

As delamination was noticed in Trial 1 samples, hot pressing of the Trial 2 4-layer sandwich composites was performed at 95° C. for 60 seconds with 11 tons of pressure. No delamination was visible after testing. The 0.2 wt % for all three nanofillers showed the largest improvement in E' and E" due to the better dispersion observed in the respective SEM images. Table 11 summarizes the E' and E" averages at 1 and 100 rad/s of Trial 2. The 0.2 wgt % $C_{60}$ shows the largest improvement reaching an E' of 495 MPa. This is more than a 15 fold increase over the control, 30.6 MPa. This is also much larger than the 90 MPa of the 0.2 wt % achieved in Trial 1. The 0.2 wt % graphite E' improved to 177 MPa while the 0.2 wt % INT's E' was 78.8 MPa at 100 rad/s. No known literature is available in which nanoparticles have been sprayed onto nonwoven surfaces or even polymeric materials to reference results of this type of nanocomposite. Even nanocomposite research in which nanoparticles have been embedded at low concentrations into the matrix to improve storage and loss modulus have never before been observed at the levels seen here.

TABLE 11

Summary of DMA data at 1 and 100 rad/s for Trial 2.

| wt % | E' (MPa) 1 | E' (MPa) 100 | E" (MPa) 1 | E" (MPa) 100 |
|---|---|---|---|---|
| $C_{60}$ | | | | |
| 0 | 20.6 | 30.6 | 2.39 | 4.58 |
| 0.2 | 340 | 495 | 37.4 | 73.9 |
| 0.6 | 170 | 249 | 19.6 | 36.7 |
| 1 | 127 | 187 | 15.4 | 28.1 |
| Graphite | | | | |
| 0.2 | 120 | 177 | 13.8 | 27.5 |
| 0.6 | 34.6 | 50.2 | 4.02 | 7.86 |
| 1 | 48.6 | 71.5 | 5.54 | 11.1 |
| INT | | | | |
| 0.2 | 48.2 | 78.8 | 8.81 | 13.8 |
| 0.6 | 26.4 | 41.6 | 5.52 | 7.75 |
| 1 | 39.8 | 70.4 | 7.86 | 12.4 |

Example 29

Nano-Reinforced Sandwich Composite Results: TPU/$C_{60}$ Compounded Sandwich Composites A frequency sweep of the 4 layer TPU/$C_{60}$ compounded sandwich composites and the neat sample were taken. The samples were hot pressed at 95° C. for 45 seconds with 11 tons of pressure. The 0.3% loaded sample shows a clear improvement of about 20 MPa or 25% across the frequency range for E' and E". The 0.1% sample shows only a very small improvement and is essentially overlaid on the neat sample. All samples showed an increasing slope over the frequency range tested.

Temperature scans were taken for 10 and 100 Hz. The 0.3% sample showed a good improvement in E' and E" over the entire temperature range while the 0.1% sample was overlaid on the neat sample data showing no improvement. The tan delta curve showed no improvement in dampening with addition of $C_{60}$ at the loadings investigated; however, there was a clear improvement in the E" curve with 0.3% loading. The lack of improvement in the tan delta was due to the equal improvement in the E' and E" curves as the ratio for tan delta stayed the same. The 100 Hz scan showed an increased Tg to 16.8° C. from 8.43° C. at 10 Hz. All samples showed the same Tg for both scans indicating addition of $C_{60}$ at the loadings investigated had no effect on the soft segment mobility.

Example 30

Nano-Reinforced Sandwich Composite Results: Spray and Compounded $C_{60}$ Sandwich Composite Comparison Bulk density was taken for each of the T90A polymer, T90A single layer web, T90A (Control) 4 layer sandwich composite, $C_{60}$ sprayed 4 layer sandwich composites, and $C_{60}$ compounded 4 layer sandwich composites. The T90A polymer had a density of 1.14 g/cc and the T90A single layer web had a bulk density of 0.221 g/cc. Therefore the T90A single layer web had about 80% porosity. The $C_{60}$ sprayed 4 layer sandwich composites showed a gradual increase in bulk density with increased $C_{60}$% wt add on from the T90A control, indicating less porosity with increasing sprayed $C_{60}$ content. The compounded $C_{60}$ 4 layer sandwich composites both showed a lower bulk density than the control ×4 sandwich, indicating greater porosity. This coincided with the air permeability and pore size data of the melt blown $C_{60}$ compounded web data.

An estimate of the storage modulus (E') of the compounded and sprayed sandwich composites may be theoretically found using the rule of mixtures (below) for upper and lower cases and compared with the experimental results.

$$E_C = E_M \phi_M + E_{C60} \phi_{C60}$$

$$\frac{1}{E_C} = \frac{\phi_M}{E_M} + \frac{\phi_{C60}}{E_{C60}}$$

Here, $E_c$ is the storage modulus of the sandwich composite, $E_M$ is the storage modulus of the sandwich composite without $C_{60}$ loading (59.5 MPa for the compounded and 30.6 for the sprayed control sandwich composites at 100 Hz). The difference in the compounded and sprayed sandwich composite moduli arises from the different web structures developed with the different process conditions and equipment used in melt blowing the webs. $E_{C60}$ is the modulus of the $C_{60}$ nanoparticles (14 GPa), while $\phi_M$ and $\phi_{C60}$ are the volume fractions of the sandwich composite and $C_{60}$ which sum to unity. Mass fraction was related to volume fraction by $\phi_{C60} = M_f^* \rho_M / \rho_{C60}$, where $\rho_M$ (1.14 g/cc) and $\rho_{C60}$ (1.72 g/cc) are the sandwich composite and $C_{60}$ densities respectively. The theoretical and experimental storage moduli for the $C_{60}$ compounded and sprayed sandwich composites are shown in Table 12.

TABLE 12

Theoretical and experimental storage moduli.

| Reinforcement Method | Weight % | Volume Fraction | Theoretical E' (MPa) Upper Bound | Theoretical E' (MPa) Lower Bound | Measured E' at 100 Hz (MPa) |
|---|---|---|---|---|---|
| Compounded | 0.1 | 0.0007 | 69.3 | 58.8 | 60.4 |
|  | 0.3 | 0.0020 | 87.4 | 59.6 | 76.4 |
| Sprayed | 0.2 | 0.0013 | 32.4 | 30.6 | 495 |
|  | 0.6 | 0.0040 | 86.5 | 30.7 | 249 |
|  | 1.0 | 0.0070 | 123 | 30.8 | 187 |

The experimental values of E' for the compounded samples fall between the calculated theoretical upper and lower bound values for both weight percents. For the sprayed samples, the model severely underestimated the measured moduli. This could have been due to a discrepancy of the loading of $C_{60}$ produced during spraying. The system pumps the nanoparticle solution from the bottom of the reservoir and if the $C_{60}$ settles during the process, the solution at the bottom of the reservoir will have a greater concentration than expected. For instance, for the 0.2% sprayed composite, if the volume fraction is actually 0.04 instead of 0.0013, the theoretical E' is 589 MPa.

SEM images were taken of the cross-sections for liquid nitrogen fractured surfaces of the neat, $C_{60}$ 1% sprayed, and $C_{60}$ 0.3% compounded 4 layer sandwich composites. The neat and 1% sprayed sandwich composites showed similar fractured surfaces sowing wave-like fracture steps. The 0.3% compounded composite showed a jagged surface indicating the $C_{60}$ nanoparticles resist fracture. This was due to the fact that they are in the polymer matrix while the sprayed $C_{60}$ is on the web surface. With $C_{60}$ embedded in the polymer of the compounded composites, loading is transferred to the $C_{60}$ and the composites respond with higher fracture toughness.

Example 31

Nano-Reinforced Sandwich Composite Results: High Frequency Response

The resonance (natural) frequencies of the materials were tested for high frequency response with the mini-shaker. The 4 layer composites tested were the $C_{60}$ spray samples (abbreviated SC followed by the add on wt % without the decimal) and the compounded $C_{60}$ samples (CC followed by the add on wt % without the decimal). The control and TEFLON® material which the samples were mounted on for support are also presented. All samples tested showed 4 resonant frequencies in similar frequency ranges. The $3^{rd}$ and $4^{th}$ modes are in the high frequency range of interest.

The damping ratio was calculated for the four modes or natural frequencies. The peak frequency and corresponding damping ratio are presented in Table 13 for each sample. The data in Table 14 was used to plot the damping ratio as a function of frequency.

TABLE 13

Peak frequency and damping ratio for each mode.

| Sample | Mode | Freq. (Hz) | Damping Ratio |
|---|---|---|---|
| Control | 1 | 39 | 0.08 |
|  | 2 | 231 | 0.07 |
|  | 3 | 614 | 0.29 |
|  | 4 | 1183 | 0.09 |
| SC02 | 1 | 40 | 0.09 |
|  | 2 | 246 | 0.11 |
|  | 3 | 690 | 0.31 |
|  | 4 | 1364 | 0.27 |
| SC06 | 1 | 39 | 0.06 |
|  | 2 | 230 | 0.08 |
|  | 3 | 634 | 0.35 |
|  | 4 | 1300 | 0.26 |
| SC1 | 1 | 45 | 0.11 |
|  | 2 | 254 | 0.11 |
|  | 3 | 698 | 0.30 |
|  | 4 | 1346 | 0.27 |

TABLE 13-continued

Peak frequency and damping ratio for each mode.

| Sample | Mode | Freq. (Hz) | Damping Ratio |
|---|---|---|---|
| Teflon | 1 | 41 | 0.11 |
| | 2 | 248 | 0.07 |
| | 3 | 690 | 0.29 |
| | 4 | 1354 | 0.31 |
| CC01 | 1 | 36 | 0.07 |
| | 2 | 224 | 0.12 |
| | 3 | 624 | 0.31 |
| | 4 | 1211 | 0.21 |
| CC03 | 1 | 39 | 0.06 |
| | 2 | 219 | 0.09 |
| | 3 | 593 | 0.37 |
| | 4 | 1189 | 0.20 |

The $3^{rd}$ mode of the materials showed the highest damping with the peaks of the different samples occurring between 600 and 700 Hz. These data clearly indicated that addition of the $C_{60}$ nanoparticles increased damping over the control alone. Also, at the peak frequencies, the Teflon showed lower damping than the sandwich composites. The peak damping ratio for each sandwich composite was measured at the $3^{rd}$ (600-700 Hz) and $4^{th}$ (1200-1350 Hz) modes. For the $3^{rd}$ mode, the compounded 0.3% $C_{60}$ sample had the highest damping ability at 0.37 over 0.29 of the control. This is contrast to the DMA results at lower frequencies. This could have arisen due to the higher frequency engaging the $C_{60}$ contracting and expanding action of its structure as the $C_{60}$ may also resonate at this frequency range. This may not occur at the lower frequencies used in DMA. The E' and E" improvements in DMA are likely due to a reinforcing action of the $C_{60}$, making the materials stiffer. These sandwich composites fabricated here showed much higher damping when compared to E-glass/Polyurethane foam sandwich composites tested on the same equipment by Vaidya (Vaidya, 2009). In a similar frequency range, his highest damping material had a damping ratio of 0.007, which is 98% lower than what was observed for the 0.3% compounded composite here.

At frequencies ranging from 1200 to 1340 Hz, the sprayed sandwich composites show higher damping ability than the compounded $C_{60}$ composites. This indicated that the materials that respond at higher frequencies are dominated by stiffness as the sprayed samples showed higher moduli in DMA testing. Vaidya also tested carbon-carbon composites and metal foam composites in this frequency range. The carbon-carbon composites showed similar damping ratios to what was observed here, however those materials possessed much greater stiffness. The metal foam composites had damping ratios ranging from 0.005 to 0.07.

Example 32

Characterization of Methods

The polymers and corresponding melt blown webs were characterized for thermal, strength, viscoelastic, and web structure properties. Sandwich composite characterizations are also incorporated into this section.

Differential Scanning Calorimetry (DSC)

Thermal analysis was carried out using the Mettler Toledo Differential Scanning calorimetry, DSC821 (Columbus, Ohio, United States of America). Samples were first dried under vacuum at 80° C. for 1 hour. All DSC scans were carried out in aluminum crucibles under nitrogen atmosphere at a flow rate of 200 mL/min with samples of 6 to 8 mg. The scans ran from 25° C. to 220° C. at a heating rate of 10° C./min, held at 220° C. for 3 min, and then cooled back to 25° C. at a rate of 10° C./min.

An annealing investigation was performed on the T90A web. DSC samples were prepared and annealed at 90° C. and 130° C. for four hours to investigate the effect of annealing temperature on the TPU morphology. DSC scans were performed as previously detailed but without the drying step.

Melt Flow Rate (MFR)

Melt flow rates of the TPU polymers were measured with a Tinius Olsen Plastometer Model MP987 (Horsham, Pa., United States of America) with a load of 2.16 kg per ASTM D1238, Procedure B. The instrument specifications are as follows: Barrel diameter: 9.55 mm; Barrel length: 162 mm; Capillary diameter: 2 mm; Capillary length: 8 mm; Travel length of piston in the barrel: 25.4 mm. Temperatures of 210, 220, 230° C. were utilized. Four readings were taken at each temperature and MFR was calculated using the following equations:

$$\text{Melt Density}\left(\frac{g}{cm^3}\right) = \frac{\text{Extrudate mass (g)}}{1.804}$$

where 1.804 $cm^3$ is the volume of the polymer that will be extruded by 25.4 mm movement of piston in the barrel if the polymer melt density is 1 gm/cc.

MFR is expressed in grams/10 min is calculated using relationship:

$$MFR = \frac{426 * L * d}{t}$$

where, L is the length of the piston travel, 2.54 cm, d is the resin density of the polymer at test temperature (g/cc), t is the time (sec) of piston travel for length L, 426 is the mean of areas of piston and cylinder×600.

Solution Viscosity

Dilute Solution Viscosity is a simple yet useful technique for analysis of polymer systems. The dependence of polymer solution viscosity on concentration and chain size gives an indication of the polymers molecular weight. The measurement of solution viscosity involves use of a constant temperature bath and a capillary viscometer. During measurement, the viscometer is inserted in the water bath which is held at a constant temperature. The polymer solution is forced from a first bulb to a second bulb, and the efflux time for the polymer to flow from time lines is recorded for different concentrations.

The solution flow time is proportional to the viscosity and inversely proportional to the respective density.

$$t_{solvent} = \eta_{solvent}/\rho_{solvent} \quad t_{soln} = \eta_{soln}/\rho_{soln}$$

Relative viscosity ($\eta_{rel}$) is defined as the ratio $\eta_{soln}/\eta_{solvent}$. With a dilute concentration of polymer in the solvent, $\rho_{soln} = \rho_{solvent}$. This allows for the following relationships:

$$\eta_{rel} = t_{soln}/t_{solvent}$$

$$\eta_{sp} = \frac{\eta_{soln} - \eta_{solvent}}{\eta_{solvent}} = \eta_{rel} - 1$$

Specific viscosity ($\eta_{sp}$) represents the incremental viscosity from polymer in the solution as seen with the relation with relative viscosity above. The inherent viscosity ($\eta_{inh}$) is related to the relative viscosity through the following equation.

$$\eta_{inh} = \frac{\ln \eta_{rel}}{c}$$

Like $\eta sp$, $\eta_{inh}$ also represents the incremental viscosity in the polymer solution. By normalizing $\eta_{sp}$ and $\eta_{inh}$ with concentration and extrapolating to zero concentration, the intrinsic viscosity can be determined. This is proved by:

$$[\eta] = \lim_{c \to 0} \frac{\eta_{sp}}{c} = \lim_{c \to 0} \frac{\ln \eta_{rel}}{c}$$

Solution viscosity measurements were taken with a Cannon Constant Temperature Bath and Ubbelodhe viscometer model OB K361 by Cannon, Inc. (State College, Pa., United States of America) at 30° C. for both raw pellets and webs processed at a DCD/Air Pressure conditions of 30/25 for the 80 g/m² screening webs and the T90A 100 g/m² web. Solutions of 0.2, 0.4, 0.6 and 0.8 g/dL concentrations were prepared in Sigma Aldrich (St. Louis, Mo., United States of America) DMF under magnetic stir. Each sample was allowed to equilibrate in the temperature bath for 15 minutes prior to testing. The efflux time was recorded for five runs and an average taken for use in plots for determining the intrinsic viscosity.

Scanning Election Microscope Imaging (SEM)

A Leo Gemini Scanning Electron Microscope (Ziess, Inc., Boston, Mass., United States of America) was used to image the respective webs and sandwich composites. Samples from 3 different locations in the web were fashioned to a metal post with conductive tape. Two posts were prepared from each sample to obtain a good representation of the webs. All samples were sputter coated with gold for conductivity. Multiple images were taken at different magnifications to analyze web structure.

Fiber Diameter Measurements

Fiber diameters were measured from images taken on a Leo Gemini Scanning Electron Microscope. For each sample, 100 total measurements taken from 3 separate locations across the web and used in calculation of average fiber diameter, standard deviation, and plotting fiber distributions.

Strength and Elongation at Break

Tensile properties of the of 1 layer web samples were determined using a United Tensile tester equipped with a 10 lb load cell per ASTM D5035. Briefly, samples of 1 inch by 6 inch size were tested with a gauge length of 3 inches at 12 inches/min crosshead speed. Results from 5 samples in the machine direction (process direction) were used to calculate average break force and percent elongation. Results were plotted as functions of DCD and air pressure.

Air Permeability

A TexTest FX3300 Air Permeability Tester (Greer, S.C., United States of America) which measures the air flow rate through a 38 cm² sample at a pressure drop of 125 Pascal was used to measure the air permeability of each melt blown web per ASTM D737. Ten samples were tested with average and standard deviation calculated.

Pore Size

The average pore diameter was determined by averaging results from 3 samples tested with a Capillary Flow Porometer, Model #CFP-1100-AEX (Ithaca, N.Y., United States of America). Measurement on the Porometer entails exclusion of a wetting liquid with very low surface tension of 0.0156 N/m from the pores of a completely saturated nonwoven media by pressurized air. When the applied air pressure exceeds the capillary attraction of the wetting liquid in the pores, air will pass through the sample, allowing the determination of the mean pore size. Smaller pores have a higher capillary attraction than larger pores and thus smaller pores open up at higher pressures.

Dynamic Mechanical Analysis (DMA)

Dynamic Mechanical Analysis is a method used for the characterization of viscoelastic properties of materials. The degree to which a polymer exhibits more solid-like or liquid-like behavior is dependent on temperature as well as time or frequency. DMA applies a sinusoidal force to a sample and the resulting sinusoidal deformation is monitored. The stress at any time is given by the equation:

$$\sigma = \sigma_0 \sin \omega t$$

where $\sigma_0$ is the maximum stress. The corresponding strain, $\varepsilon$, is given by:

$$\varepsilon = \varepsilon_0 \sin(\omega t - \delta)$$

A purely elastic material is one in which all the energy stored in the sample during loading is returned when the load is removed. Elastic materials follow Hooke's Law and the stress in proportional to the strain while the modulus is the ratio of the stress to strain. For a purely viscous material, all of the energy applied during loading is dissipated or lost by conversion to heat once the load is removed. Here the stress is 90° out of phase with the strain and the ratio of stress to strain is known as viscosity.

For viscoelastic materials, the sample response lags behind the applied stress wave with respect to time. This lag is known as the phase angle, $\delta$. The stress can be resolved into two parts, in-phase (elastic) and out-of-phase (viscous) with the strain. The storage modulus (E') corresponds with the in-phase or elastic part while the loss modulus (E") relates the out-of-phase or viscous part with tan $\delta$ as the ratio of E" to E'. They are defined mathematically by the following equations:

$$E' = \frac{\sigma_0 \cos \delta}{\varepsilon_0}$$

$$E'' = \frac{\sigma_0 \sin \delta}{\varepsilon_0}$$

$$\tan \delta = E'' / E'$$

The storage modulus (E') refers to a materials ability to return or store energy. For glassy or amorphous polymers, E' is high and lower for rubber or semicrystalline polymers. The loss modulus (E") is associated with the viscous response and represents the energy converted to heat by the molecular motions from the material under stress. Tan delta is the ratio of the E" to E', consequently it behaves much like E" but is independent of sample dimensions. It translates to a measurement of the ratio of energy absorbed by the sample as heat to the energy used by the sample to return to its original shape. The loss modulus and tan delta are indicators of the polymers ability to internally dissipate energy which is why peaks in tan delta are often referred to as damping peaks.

The DMA technique is sensitive to the various transitions which a polymer undergoes as a function of changing temperature and frequency of the applied stress or strain. They exist in various states or phases over broad temperature and frequency ranges, and the behavior regions are typically referred to as the glassy, transition, rubbery, and flow regions. Viscoelastic materials behave differently based on which region they exist in for a specific application.

In the glass region, the polymer chains are ordered into crystalline domains with the polymer possessing rigid glass-like behavior. Stiffness, E', of the material is at its highest point in this region while the damping, E" and tan delta, are typically low. In the transition region, the polymer is transitioning from a glass to a rubber state. In this region, the polymer goes through its most rapid rate of change in stiffness and possesses its highest level of damping performance. The polymer chains are in semi-rigid and semi-flow states and are able to rub against adjacent chains creating friction. The frictional effects result in the mechanical damping characteristics of viscoelastic materials. In the rubber region, the polymer is above the glass transition and below the melting temperature. The polymer reaches a lower plateau in stiffness and damping is lower. In the flow region also termed the terminal region, the polymer has reached its melting point and the polymer chains slide past each other and the polymer flows.

The thermal transitions in polymers can be described by changes in free volume changes or relaxation times to supply information for the various segmental motions. Changes in free volume can be monitored as a volumetric change in the polymer by the absorption and release of heat associated with that change, by the loss of stiffness, increased flow, or a change in relaxation time. The free volume concept is defined as the space within the polymer unoccupied by the polymer chains. The variation of free volume with temperature where the amount of free volume increases with increasing temperature above the Tg. The slope of the specific volume curve is the coefficient of thermal expansion, CTE, and, in fact, one definition of the Tg is the point at which the coefficient of thermal expansion suffers a discontinuity. The variation in free volume allows for greater mobility of the molecular chains and gives rise to greater time or viscoelastic effects as temperature increases.

A simple approach to looking at free volume is the crankshaft model where the polymer chains are imagined as a series of jointed segments. The crankshaft model treats the polymer chain as a collection of mobile segments that have some degree of free movement. As the free volume of the chain segment increases, its ability to move also increases. This increased mobility in either side chains or segments of the chain backbone results in lower moduli of the polymer.

At very low temperatures where the polymer chains are tightly compressed they pass through the solid state transitions. The localized bond movement of bending and stretching and small side chain movements is ascribed as the gamma (γ) transition. As the temperature and free volume increases, whole side chains and localized groups of four to eight backbone atoms begin to have enough space to move and the material starts to develop toughness. Such transitions are called beta (β) transitions. The large scale motions of the amorphous regions as heating increases further are related to the glass (α) transition. The Tg is very dependent on the degree of polymerization up to a value known as the critical Tg or critical molecular weight. The Fox-Flory empirical equation describes reasonably well the Tg dependence on molecular weight.

$$T_g(M_n) = T_g(\infty) - \frac{K}{M_n}$$

Here Tg (∞) is the maximum glass transition temperature that can be achieved at infinite molecular weight and K is an empirical parameter related to the free volume present in the polymer. The free volume approach explains the Fox-Flory equation, assuming that chain ends contribute an excess free volume. In that case, a decrease in Mn leads to an increase of chain end concentration and increase of free volume. Therefore an increase in free volume leads to decrease in Tg. Above that threshold the rubbery state appears. The modulus in that region is proportional to the number of cross-links or the molecular weight between entanglements, $M_e$. This is often expressed as $$E' \sim \frac{(\rho RT)}{M_e}$$

Here, E' is the storage modulus in the rubbery plateau at a specific temperature (T), ρ is the polymer density, and R is the gas constant. Dependent of the polymer, other transitions may be seen in the region between Tg and the melting point of the polymer.

There are at least five different accepted methods for determining Tg from DMA temperature scans. The peak or onset of the tan delta curve, the onset of E' drop, or the onset or peak of the E" curve may be used. The values obtained from these methods can differ up to 25° C. from each other on the same run. In addition, a 10-30° C. difference from the DSC Tg is also seen in many materials. In practice, it is important to specify exactly how the Tg was determined, including defining the heating rate, applied stress or strains, the frequency used, and the method for determining Tg.

The relaxation spectrum of a polymer may also be analyzed using a frequency sweeps at a constant temperature. These types of scans however are limited to the lowest and highest frequencies attainable by the DMA. Typically, DMA frequencies range from 0.001 to 100 Hz. This range is generally not great enough to cover the entire range of the relaxation spectrum. In these cases, the William-Landel-Ferry (WLF) equation is employed to exploit the equivalent relations of high temperature-low frequency and low temperature-high frequency aspects of viscoelastic materials relaxations.

$$\log a_t = \frac{-C_1(T - T_0)}{C_2 + T - T_0}$$

Here, $a_T$ is termed the horizontal shift factor, $C_1$ and $C_2$ are empirical constants used to fit the values of the superposition parameter $a_T$. $T_0$ is the reference temperature and usually taken as Tg of the polymer. To employ the WLF equation, multiple frequency sweeps are employed at different temperatures and a master curve is constructed for a particular reference temperature. This is termed the Time-Temperature Superposition Principle (TTS). The relaxation time of the material may be taken for the crossover point of E' and E" and the reciprocal of the frequency at that point.

The materials in this research were tested by DMA with frequency sweeps in tensile mode from 1 to 100 Hz at 25° C. with 0.1% strain applied. A Rheometric DMTA V and a TA Q800 DMA were utilized. No discrepancies in the results were found using two different instruments. Three samples of each material were tested and averages of the three are reported. Sample dimensions were 10 mm in length and 5 mm in width. The TA Q800 was also used to conduct temperature scans in tensile mode from −100 to 60° C. at a heating rate of 3° C./min and at 1, 10 and 100 Hz. The 1 Hz frequency curves showed a lot of noise due to relaxation of the stress over the sample and are not presented. Two samples of each material were tested to ensure repeatable results within a sample lot. Sample dimensions were 10 mm in length and 5 mm in width. The glass transition of the materials is taken as the peak of the tan delta curves.

Densification

Sample bulk density measurements were performed by cutting samples to 3 cm length and 3 cm widths. Thickness and mass were then measured using a TMI thickness tester Model 49-70 and a Mettler Toledo (need company city, state, United States of America) micro-balance to calculate the bulk density.

Fracturing

To investigate the fracture mechanics, samples were dropped into liquid nitrogen and allowed to sit for one minute. The samples were then removed and fractured. The fractured surface was examined by Scanning electron microscope imaging.

High Frequency Vibration Testing

High frequency vibration testing of the 4 layer sandwich composites was performed under continuous excitation with a mini-shaker. The sample dimensions were 4 inches in length and 0.5 inches in width and supported by lightly bonding with a spray adhesive to a Teflon beam. The samples were mounted in a free-free edge support condition by mounting at their center and directly over the impedance head with double-sided tape.

The instrument operates by applying a random noise excitation through a noise generator which is amplified by a power amplifier to excite the Bruel and Kjaer Type 4809 electrodynamic shaker (Norcross, Ga., United States of America). A Bruel and Kjaer Type 4000 impedance head mounted over the stinger rod of the shaker measures input force and output acceleration. The vibration response was measured using a dual channel Bruel and Kjaer Pulse Analyzer after the signal is amplified by two Kistler-Type 5004 dual mode preamplifiers. The frequency response function (FRF) is plotted against frequency to get the baseband response. Damping is measured by zoom transform at each frequency and the damping ratio by the half was calculated power bandwidth method also known as the −3 dB drop method.

Example 33

Conclusions

TPU Screening-Melt Blown TPU Webs

Thermoplastic polyurethane polymers with aromatic based hard segments and ether or ester based soft segments with shore hardness ranging from 60D to 85A were melt blown into nonwoven microfiber webs. The webs were collected at multiple die-to-collector distances (DCD) and air pressures to analyze the changes in web structure and properties. Web strength at break was found to decrease with shore hardness while elongation at break increased with decreasing shore hardness. Ester based webs possessed greater strength due to a higher degree of hydrogen bonding and lower degree of phase separation. Web strength and elongation at break decreased with increasing DCD while higher air pressure increased both. Web mechanical properties were found to be largely dependent on the degree of fiber-to-fiber bonding in the webs which decreases with increasing DCD due to the fibers being cooler once landing on the collection belt. At low DCDs, the fibers are close to the melt temperature and are able to form a high degree of fiber-to-fiber bonding points. The average fiber diameter of the S92A and T85A webs decreased with increasing air pressure while the S60D, T55D, and T92A webs showed very little change. The average pore size and air permeability were both found to increase with increasing DCD and decrease with increasing air pressure. At higher air pressure, the fibers travel at a faster rate to the collection belt and consequently, they are at a higher temperature and form a more consolidated web with greater fiber-to-fiber bonding. The shore hardness D polymers required high processing temperatures in order to prevent overheating of the extruder and consequently lost over 50% if the polymer intrinsic viscosity. The shore hardness 85A polymers were difficult to collect and exhibited low stiffness which would create difficulties in coating experiments.

Dynamic mechanical analysis temperature scans indicate the storage modulus increases with increasing shore hardness while the magnitude of tan delta decreases with increasing shore hardness. The glass transition was found to increase with shore hardness and frequency. In order to exploit the transition from rubber to glass phase at high velocity impact, a ether based soft segment TPU of 90A shore hardness was chosen. Its glass transition was found to be in the range of expected use temperature and its predicted glass transition also fell within the range of high frequencies associated with high velocity impacts. It also had the best processability of the polymers.

Nanoparticle Reinforced Sandwich Composites

Coated Sandwich Composites

The dip coating methods provided little to no improvement in storage and loss moduli of the sandwich composites at 1, 3 and 5 add on weight percent for nanoclay and $C_{60}$. The continuous coating method over-saturated the webs and required high drying temperatures. Dispersion of the nanoclay was also poor with random aggregation. The individual dip coating with nanoclay and $C_{60}$ had very poor dispersion of the nanoparticles. A high degree of aggregation and agglomerates were observed with SEM imaging.

The continuous spray coating with the Sono-Tek (Milton, N.Y., United States of America) system was conducted with two trials. In trial 1, the concentration of the nanoparticle solutions was maintained while the volume flow rate and belt speed were changed to achieve the desired add on weight percent of nanoparticles. The webs had to be coated on both sides with half of the desired add on weight percent to achieve 1, 3 and 5% by weight add on. This was done to stay under the solubility limit of the nanoparticles in their respective solvent. Good improvements in storage and loss moduli were observed at $C_{60}$ loadings of 1 and 3 percent by weight. The 5 wt % $C_{60}$ loading had no improvement. SEM analysis showed good dispersion at the 1% add on level with some aggregation of the nanoparticles. Dispersion decreased and the degree of aggregation increased with increased loading. The POSS nanoparticles showed no improvement in moduli.

In trial two, the volume flow rate and belt speed were held constant while the nanoparticle solution concentration was changed to achieve the desired add on weight percent of nanoparticles. Add on weight percent of 0.2, 0.6, and 1 were investigated with $C_{60}$, graphite, and tungsten disulfide inorganic nanotubes (INT). These lower percent's gave much higher improvements in the storage and loss moduli. A uniform dispersion was found at all 0.2% loadings. Aggregation and some non-uniform dispersion were observed with increased loading and some agglomerations were found at the 1% loading. The 0.2 wt % showed the greatest improvement for all the nanoparticles investigated. The 0.2 wt % $C_{60}$ shows the largest improvement reaching an E' of 495 MPa. This is more than a 15 fold increase over the control, 30.6 MPa. The 0.2 wt % graphite improved to 177 MPa while the 0.2 wt % INT's E' was 78.8 MPa at 100 rad/s.

Compounded TPU/$C_{60}$ Sandwich Composites

TPU/$C_{60}$ blends were melt blown at loadings of 0.1 and 0.3 weight percent and fabricated into sandwich composites. The 0.3% composites showed 25% improvement in storage and loss moduli over the control. The 0.1% loading gave no improvement. The level of improvement of the 0.3% $C_{60}$ compounded sandwich composite was found to be six times less than that of the 0.2% sprayed composite.

High Frequency Testing

All sandwich composites with $C_{60}$ loading showed improved damping over the control. At the third resonant mode for the TPU where frequencies ranged between 600 and 700 Hz, the compounded 0.3% $C_{60}$ composite showed the greatest damping ability with a damping ratio of 0.37 compared to 0.29 for the control. At the fourth resonant mode with frequencies between 1200 to 1350 Hz, the sprayed composites showed greater damping ability than the compounded with the 0.6% composite having the greatest damping ratio at 0.26 while the control dropped to 0.09. In all cases, the damping ratios were more than an order of magnitude higher than those reported in literature for E-glass/polyurethane foams and metal composite foams.

Discussion of Examples 1-32

The presently disclosed subject matter demonstrates that one can produce flexible composite structures suitable for energy absorption by reinforcing polyurethane nonwoven webs with high strength and high modulus nanoparticles. To determine the appropriate TPU for the application, a series of TPUs with different shore hardness were melt blown to investigate processability, web structure, mechanical, and thermal properties. It was determined that, in some embodiments, a TPU of about 90A shore hardness was most suitable and possessed a glass transition in the ideal range to exploit the transition from rubber to glass phase to allow for large amounts of energy dissipation upon high velocity impact. The ultra-sonic spray coating method produced the most uniform dispersion of nanoparticles and greatest improvement in the dynamic mechanical properties of the reinforcement methods investigated. A high degree and quality of dispersion was obtained at the lowest add on weight percent of nanoparticles investigated, 0.2%, which consequently gave the greatest property improvement. Of the multiple nanoparticles used for reinforcement, $C_{60}$ provided the greatest improvement in damping ability. With optimized spray coating parameters, the storage and loss moduli of the $C_{60}$ reinforced sandwich composite at 0.2% by weight loading showed and improvement of 15 times over the control sample.

REFERENCES

All references listed herein including but not limited to all patents, patent applications and publications thereof, scientific journal articles, and database entries are incorporated herein by reference in their entireties to the extent that they supplement, explain, provide a background for, or teach methodology, techniques, and/or compositions employed herein.

1. Rubin Michael, Asymmetric Threat Concept and its Reflections on International Security, Strategic Research and Study Center (SAREM), Instanbul, May 31, 2007.
2. Okie, S. "Traumatic Brain Injury in the War Zone." The New England Journal of Medicine. 352.20 (2005): 2043-2047.
3. Moulton, J. "Rethinking IED Strategies: From Iraq to Afghanistan." Military Review. July-August (2009): 26-33.
4. Meyers, M. A. (1994). Dynamic behavior of materials. New York: Wiley.
5. Cooper, A. "Training for a Mission in an IED Threat Environment." Military Technology. 12 (2008): 68.
6. Improvised Explosive Devices (IEDs)—Iraq. 1 Nov. 2005. Globalsecurity.org. 14 Apr. 2009.
7. "We will defeat the IED." Military Technology. 10 (2008): 20-27.
8. "Department of Defense Dictionary of Military and Associative Terms." Joint Armed Forces. 17 Oct. 2008.
9. "Shockwave." Columbia Electronic Encyclopedia. 6th ed. 1 Jan. 2009.
10. Eshel, D. "IED Blast related Brain Injuries: The silent killer." 2009. Defense Update, Online Holdings International. 21 Aug. 2009.
11. R. Lane, B. Craig, W. Babcock, "Materials for blast and penetration resistance", The AMPTIAC Quarterly, 6(4), pp. 39-45, 2002.
12. Agrawal, B. J. (2011). High performance textiles for ballistic protection. Defense Science Research Conference and Expo (DSR), 2011.
13. K. H. Taber, D. L. Warden, and R. A. Hurley, Blast-Related Traumatic Brain Injury: What Is Known?, J. Neuropsychiatry Clin. Neurosci., 2006, 18, p 141-145
14. Meyer, K. et al. "Severe and Penetrating Traumatic Brain Injury in the Context of War." Journal of Trauma Nursing. 15.4 (2008): 185-191.
15. Chafi, M. S., G. Karami, et al. (2010). "Biomechanical Assessment of Brain Dynamic Responses Due to Blast Pressure Waves." Annals of Biomedical Engineering 38(2): 490-504.
16. Ruff, R. L. et al. "Headaches among Operation Iraqi Freedom/Operation Enduring Freedom veterans with mild traumatic brain injury associated with exposure to explosions." Journal of Rehabilitation Research & Development. 45.7 (2008): 941-952.
17. Przekwas, A., Tan, X. G., Harrand, V., Reeves, D., Chen, Z. J., Sedberry, K., et al. (2011). "Integrated experimental and computational framework for the development and validation of blast wave brain biomechanics and helmet protection," in Proc. HFM-207 NATO Symposium on a Survey of Blast Injury Across the Full Landscape of Military Science (Halifax, NS).
18. Prat, N., F. Rongieras, et al. (2012). "Contemporary body armor: technical data, injuries, and limits." European Journal of Trauma and Emergency Surgery 38(2): 95-105.
19. Cheeseman, B. A. and T. A. Bogetti (2003). "Ballistic impact into fabric and compliant composite laminates." Composite Structures 61(1-2): 161-173.

20. Duan, Y., Keefe, M., Bogetti, T. A., and Powers, B., 2006. 'Finite element modeling of transverse impact on a ballistic fabric', International Journal of Mechanical Sciences, 48, pp 33-43.
21. F. Ko and A. Geshury, Textile Preforms for Composite Materials Processing, Advanced Materials and Processes Information Analysis Center, AMPT-19, August 2002
22. Orange. (n.d.). usmc-collectors. Retrieved Aug. 12, 2013, from http://usmc-collectors.pagesperso-orange.fr/fichiers%20listes%20et%20divers/body%20armor.htmhttp://
23. Carey, M. E., M. Herz, et al. (2000). "Ballistic Helmets and Aspects of Their Design." Neurosurgery 47(3): 678-689.
24. Drobny, J. G. (2007). Handbook of thermoplastic elastomers. Norwich, N.Y.: William Andrew Pub.
25. Harper, C. A. (1996). Handbook of plastics, elastomers, and composites (3rd ed.). New York: McGraw-Hill.
26. Holden, G. (1996). Thermoplastic elastomers (2nd ed.). Munich: Hanser Publishers.
27. Polymers and plastics: a chemical introduction. (n.d.). Steve Lower stuff.
28. Holden, G. (2000). Understanding thermoplastic elastomers. Munich: Hanser.
29. Prisacariu, C. (2011). Polyurethane elastomers from morphology to mechanical aspects. Wien: Springer.
30. Gu, X. and P. T. Mather (2012). "Entanglement-based shape memory polyurethanes: Synthesis and characterization." Polymer 53(25): 5924-5934.
31. Strength stress strain curve gallery. (n.d.). this pic.com. Retrieved Aug. 12, 2013, from pics1.this-pic.com/key/%20strength%20stress%20strain%20curveh
32. Molded Dimensions—Engineered Elastomer Solutions to help you win!. (n.d.). Molded Rubber Part Molded Rubber Custom Molded Rubber Molded Rubber Product Molded Rubbers.
33. Yi, J., M. C. Boyce, et al. (2006). "Large deformation rate-dependent stress-strain behavior of polyurea and polyurethanes." Polymer 47(1): 319-329.
34. Heijboer, J. (1969). "Modulus and damping of polymers in relation to their structure." British Polymer Journal 1(1): 3-14.
35. Boyer, R. F. (1968). "Dependence of mechanical properties on molecular motion in polymers." Polymer Engineering & Science 8(3): 161-185.
36. Vincent, P. I. (1974). "Impact strength and mechanical losses in thermoplastics." Polymer 15(2): 111-116.
37. Roland, C. M. and R. Casalini (2007). "Effect of hydrostatic pressure on the viscoelastic response of polyurea." Polymer 48(19): 5747-5752.
38. Bogoslovov, R. B., C. M. Roland, et al. (2007). "Impact-induced glass transition in elastomeric coatings." Applied Physics Letters 90(22): 221910-221910-221913.
39. Roland, C. M., D. Fragiadakis, et al. (2010). "Elastomer-steel laminate armor." Composite Structures 92(5): 1059-1064.
40. Casalini, R., R. Bogoslovov, et al. (2012). "Nanofiller reinforcement of elastomeric polyurea." Polymer 53(6): 1282-1287.
41. Roland, C. M. (2012). "GLASS TRANSITION IN RUBBERY MATERIALS." Rubber Chemistry and Technology 85(3): 313-326.
42. Choi, T., D. Fragiadakis, et al. (2012). "Microstructure and Segmental Dynamics of Polyurea under Uniaxial Deformation." Macromolecules 45(8): 3581-3589.
43. Pathak, J. A.; Twigg, J. N.; Nugent, K. E.; Ho, D. L.; Lin, E. K.; Mott, P. H.; Robertson, C. G.; Vukmir, M. K.; Epps, T. H. III; Roland, C. M. Macromolecules 2008, 41, 7543-7548.
44. Fragiadakis, D.; Gamache, R.; Bogoslovov, R. B.; Roland, C. M. Polymer 2010, 51, 178-184.
45. Shim, J.; Mohr, D. Int. J. Impact Eng. 2009, 36, 1116-1127.
46. Sarva, S. S.; Deschanel, S.; Boyce, M. C.; Chen, W. Polymer 2007, 48, 2208-2213.
47. Xue, L.; Mock, W. Jr.; Belytschko, T. Mech. Mater. 2010, 42, 981-1003.
48. Davidson, J. S.; Fisher, J. W.; Hammons, M. I.; Porter, J. R.; Dinan, R. J. J. Struct. Eng. ASCE 2005, 131, 1194-1205.
49. Jiao, T.; Clifton, R. J.; Grunschel, S. E. High strain rate response of an elastomer. In Shock Compression of Condensed Matter 2005, Parts 1 and 2; 2006; Vol. 845, pp 809-812.
50. Amirkhizi, A. V.; Isaacs, J.; McGee, J.; Nemat-Nasser, S. Philos. Mag. 2006, 86, 5847-5866.
51. Tekalur, S. A., A. Shukla, et al. (2008). "Blast resistance of polyurea based layered composite materials." Composite Structures 84(3): 271-281.
52. Grujicic, M., W. C. Bell, et al. (2010). "Blast-wave impact-mitigation capability of polyurea when used as helmet suspension-pad material." Materials & Design 31(9): 4050-4065.
53. Grujicic, M., B. Pandurangan, et al. (2010). "Computational investigation of impact energy absorption capability of polyurea coatings via deformation-induced glass transition." Materials Science and Engineering: A 527(29-30): 7741-7751.
54. Grujicic, M., R. Yavari, et al. (2012). "Molecular-level computational investigation of shock-wave mitigation capability of polyurea." Journal of Materials Science 47(23): 8197-8215.
55. Wente, V. A. (1956). "Superfine Thermoplastic Fibers." Industrial & Engineering Chemistry 48(8): 1342-1346.
56. Ellison, C. J., A. Phatak, et al. (2007). "Melt blown nanofibers: Fiber diameter distributions and onset of fiber breakup." Polymer 48(11): 3306-3316.
57. R. R. Breese, W. Ko, Fiber formation during melt blowing, Int. Nonwovens J. (2003).
58. Lee, Y. E. and L. C. Wadsworth, "Process Property Studies of Melt Blown Thermoplastic Polyurethane Polymers for Protective Apparel," International Nonwovens Journal, 2-9, Winter 2005.
59. Deniz Duran (2012). Investigation of the Physical Characteristics of Polypropylene Meltblown Nonwovens Under Varying Production Parameters, Thermoplastic Elastomers, Prof. Adel El-Sonbati (Ed.), ISBN: 978-953-51-0346-2, InTech, DOI: 10.5772/36798.
60. Batra, S. K., & Pourdeyhimi, B. (2012). Introduction to nonwovens technology. Lancaster, Pa.: Destech Publications.
61. Krutka, H. M., R. L. Shambaugh, et al. (2002). "Analysis of a Melt-Blowing Die: Comparison of CFD and Experiments." Industrial & Engineering Chemistry Research 41(20): 5125-5138.
62. Tate, B. D. and R. L. Shambaugh (2004). "Temperature Fields below Melt-Blowing Dies of Various Geometries." Industrial & Engineering Chemistry Research 43(17): 5405-5410.

63. Krutka, H. M., R. L. Shambaugh, et al. (2003). "Effects of Die Geometry on the Flow Field of the Melt-Blowing Process." Industrial & Engineering Chemistry Research 42(22): 5541-5553.
64. Krutka, H. M., R. L. Shambaugh, et al. (2004). "Effects of Temperature and Geometry on the Flow Field of the Melt Blowing Process." Industrial & Engineering Chemistry Research 43(15): 4199-4210.
65. Marla, V. T. and R. L. Shambaugh (2004). "Modeling of the Melt Blowing Performance of Slot Dies." Industrial & Engineering Chemistry Research 43(11): 2789-2797.
66. Shambaugh, B. R., D. V. Papavassiliou, et al. (2012). "Modifying Air Fields To Improve Melt Blowing." Industrial & Engineering Chemistry Research 51(8): 3472-3482.
67. Shambaugh, B. R., D. V. Papavassiliou, et al. (2011). "Next-Generation Modeling of Melt Blowing." Industrial & Engineering Chemistry Research 50(21): 12233-12245.
68. Sun, Y., Y. Zeng, et al. (2010). "Three-Dimensional Model of Whipping Motion in the Processing of Microfibers." Industrial & Engineering Chemistry Research 50(2): 1099-1109.
69. Xin, S. and X. Wang (2012). "Mechanism of Fiber Formation in Melt Blowing." Industrial & Engineering Chemistry Research 51(32): 10621-10628.
70. Tan, D. H., C. Zhou, et al. (2010). "Meltblown fibers: Influence of viscosity and elasticity on diameter distribution." Journal of Non-Newtonian Fluid Mechanics 165 (15-16): 892-900.
71. Zhou, C., D. H. Tan, et al. (2011). "Modeling the melt blowing of viscoelastic materials." Chemical Engineering Science 66(18): 4172-4183.
72. Lee, Y. and L. C. Wadsworth (1990). "Structure and filtration properties of melt blown polypropylene webs." Polymer Engineering & Science 30(22): 1413-1419.
73. Lee, Y. and L. C. Wadsworth (1992). "Effects of melt-blowing process conditions on morphological and mechanical properties of polypropylene webs." Polymer 33(6): 1200-1209.
74. Bresee, R. R., & Qureshi, U. A. (2004). Influence of Processing Conditions on Melt Blown Web Structure. Part 1-DCD. International Nonwovens Journal, 13(1), 49-55.
75. Lee, Y. E. and L. C. Wadsworth (2007). "Fiber and web formation of melt-blown thermoplastic polyurethane polymers." Journal of Applied Polymer Science 105(6): 3724-3727.
76. Zapletalova, T., Michielsen, S., & Pourdeyhimi, B. (2006). Polyether based thermoplastic polyurethane melt blown nonwovens. J. of Engineered Fibers and Fabrics, 1(1), 62-72.
77. Begenir, A., S. Michielsen, et al. (2009). "Crystallization behavior of elastomeric block copolymers: Thermoplastic polyurethane and polyether-block-amide." Journal of Applied Polymer Science 111(3): 1246-1256.
78. Begenir, A., S. Michielsen, et al. (2009). "Melt-blowing thermoplastic polyurethane and polyether-block-amide elastomers: Effect of processing conditions and crystallization on web properties." Polymer Engineering & Science 49(7): 1340-1349.
79. Gazzola, William Horst, "Melt Blown Poly(lactic acid) for Application as a Tissue Engineering Scaffold." Master's Thesis, University of Tennessee, 2012. http://trace.tennessee.edu/utk_gradthes/1379
80. Ya Liu, Bowen Cheng, et al. (2010). "Development and Filtration Performance of Polylactic Acid Meltblowns." Textile Research Journal 80(9): 771-779.
81. Chen, T., L. Li, et al. (2005). "Fiber diameter of polybutylene terephthalate melt-blown nonwovens." Journal of Applied Polymer Science 97(4): 1750-1752.
82. Bianchi, M., F. Scarpa, et al. (2008). "Stiffness and energy dissipation in polyurethane auxetic foams." Journal of Materials Science 43(17): 5851-5860.
83. Peleg, K. (1980). "Cushioning energy dissipation in foam polymers." Polymer Engineering & Science 20(11): 738-740.
84. Lutter, H. D., Leppkes, R., Horn, P., Decker, W., Haase, V., & Hinz, W. (1995). U.S. Pat. No. 5,420,170. Washington, D.C.: U.S. Patent and Trademark Office.
85. Hager, S. L., Jividen, V. C., Triouleyre, S. P., & Joulak, F. (2002). U.S. Pat. No. 6,391,935. Washington, D.C.: U.S. Patent and Trademark Office.
86. Johnson, G. G., Landin, D. T., Jung, M. A., & McCutcheon, J. W. (2001). U.S. Pat. No. 6,251,493. Washington, D.C.: U.S. Patent and Trademark Office.
87. "Polyurethane Foams." SAE International. N.p., n.d. Web. 18 Nov. 2013. <http://www.sae.org/search/?authors=%28%22Peter%20Gansen%22%29
88. Mendelsohn, M. A., F. W. Navish, et al. (1985). "Characteristics of a Series of Energy-Absorbing Polyurethane Elastomers." Rubber Chemistry and Technology 58(5): 997-1013.
89. Yoon, K., J. Kim, et al. (2003). "Damping properties and transmission loss of polyurethane. II. PU layer and copolymer effect." Fibers and Polymers 4(2): 49-53.
90. ZHU Jin hua, YAO Shu ren (Naval Academy of Engineering, Wuhan 430033, China); Study of the Morphology and Dynamic Mechanical Properties of Polyurethane Elastomers; Polymeric Materials Science and Engineering, 2000-05
91. Wang Jianhua, Luo Chenlei (Institute of Chemical Materials, Advances in the Research of Polyurethane Damping Materials; Engineering Plastics Application; 2002-10
92. Bilal Khan, M. (2010). "Intelligent Viscoelastic Polyurethane Intrinsic Nanocomposites." Metallurgical and Materials Transactions A 41(4): 876-880.
93. Hwang, G. L., Y. T. Shieh, et al. (2004). "Efficient Load Transfer to Polymer-Grafted Multiwalled Carbon Nanotubes in Polymer Composites." Advanced Functional Materials 14(5): 487-491.
94. Mackintosh, A. R. and Pethrick, R. A. and Banks, W. M. (2011) Dynamic characteristics and processing of fillers in polyurethane elastomers for vibration damping applications. Proceedings of the Institution of Mechanical Engineers, Part L: Journal of Materials: Design and Applications, 225 (3). pp. 113-122. ISSN 1464-4207
95. Xia, H. and M. Song (2005). "Preparation and characterization of polyurethane-carbon nanotube composites." Soft Matter 1(5): 386-394.
96. Tzong-Liu Wang, Chin-Chung Yu, Chien-Hsin Yang, Yeong-Tarng Shieh, Yu-Zen Tsai, and Na-Fu Wang, "Preparation, Characterization, and Properties of Polyurethane-Grafted Multiwalled Carbon Nanotubes and Derived Polyurethane Nanocomposites," Journal of Nanomaterials, vol. 2011, Article ID 814903, 9 pages, 2011. doi:10.1155/2011/814903
97. Chen, W., X. Tao, et al. (2006). "Carbon nanotube-reinforced polyurethane composite fibers." Composites Science and Technology 66(15): 3029-3034.
98. Khan, U., P. May, et al. (2010). "Development of stiff, strong, yet tough composites by the addition of solvent exfoliated graphene to polyurethane." Carbon 48(14): 4035-4041.

99. Pei, A., J.-M. Malho, et al. (2011). "Strong Nanocomposite Reinforcement Effects in Polyurethane Elastomer with Low Volume Fraction of Cellulose Nanocrystals." Macromolecules 44(11): 4422-4427.
100. Nunes, R. C. R., J. L. C. Fonseca, et al. (2000). "Polymer-filler interactions and mechanical properties of a polyurethane elastomer." Polymer Testing 19(1): 93-103
101. A. C. D. Newman, Chemistry of Clays and Clay Minerals, John Wiley & Sons, New York (1987).
102. B. K. G. Theng, The Chemistry of Clay-Organic Reactions, John Wiley & Sons, New York (1974).
103. P. C. LeBaron, Z. Wang, and T. J. Pinnavaia, Appl. Clay Sci., 15, 29 (1999).
104. Lee, K. Y. and L. A. Goettler (2004). "Structure-property relationships in polymer blend nanocomposites." Polymer Engineering & Science 44(6): 1103-1111.
105. M. R. Kamal; N. K. Borse; A. Garcia-Rejon. Polymer Engineering & Science 2002, 42, (9), 1883-1896.
106. Organoclays Nanoclay Additives for Reinforced Plastics. (n.d.). Organoclays Nanoclay Additives for Reinforced Plastics.
107. "SES Research." Fullerene. N.p., n.d. Web. 11 Aug. 2013. <https://sesres.com/>.
108. "Hybrid PlasticsÂ®: NanostructuredÂ® POSSÂ® Chemicals." Hybrid PlasticsÂ®. N.p., n.d. Web. 13 Aug. 2013. <http://www.hybridplastics.com/products/catalog.htm#acryl>.
109. "NanoMaterials." Polymer Applications. N.p., n.d. Web. 11 Aug. 2013. <www.apnano.com/http://>.
110. Menard, K. P. (2008). Dynamic mechanical analysis: a practical introduction. Boca Raton, Fla. [u.a.: CRC Press.
111. Viscoelastic Damping." *Roush Industries*. N.p., n.d. Web. 1 Nov. 2013.
112. Brinson, H. F., & Brinson, L. C. (2008). Polymer engineering science and viscoelasticity: an introduction. Springer.
113. Gennes, P. (1979). Scaling concepts in polymer physics. Ithaca, N.Y.: Cornell University Press.
114. Doi, M., & Edwards, S. F. (1987). The theory of polymer dynamics. Oxford [Oxfordshire: Clarendon Press.
115. Ferry, J. D. (1980). Viscoelastic properties of polymers (3d ed.). New York: Wiley.
116. Flory, P. J. (1978). Principles of polymer chemistry (10. print. ed.). Ithaca, N.Y.: Cornell Univ. Pr.
117. Velankar, S. and S. L. Cooper (1999). "Microphase Separation and Rheological Properties of Polyurethane Melts. 2. Effect of Block Incompatibility on the Microstructure." Macromolecules 33(2): 382-394.
118. Speckhard, T. A., P. E. Gibson, et al. (1985). "Properties of polyisobutylene polyurethane block copolymers: 2. Macroglycols produced by the 'inifer' technique." Polymer 26(1): 55-69.
119. Velankar, S. and S. L. Cooper (1998). "Microphase Separation and Rheological Properties of Polyurethane Melts. 1. Effect of Block Length." Macromolecules 31(26): 9181-9192.
120. Van Bogart, J. W. C., D. A. Bluemke, et al. (1981). "Annealing-induced morphological changes in segmented elastomers." Polymer 22(10): 1428-1438.
121. Seymour, R. W. and S. L. Cooper (1973). "Thermal Analysis of Polyurethane Block Polymers." Macromolecules 6(1): 48-53.
122. Ng, H. N., Allegrezza, A. E., Seymour, R. W., & Cooper, S. L. (1973). Effect of segment size and polydispersity on the properties of polyurethane block polymers. Polymer, 14(6), 255-261.
123. Hu, W. and J. T. Koberstein (1994). "The effect of thermal annealing on the thermal properties and molecular weight of a segmented polyurethane copolymer." Journal of Polymer Science Part B: Polymer Physics 32(3): 437-446.
124. Koberstein, J. T. and L. M. Leung (1992). "Compression-molded polyurethane block copolymers. 2. Evaluation of microphase compositions." Macromolecules 25(23): 6205-6213.
125. Koberstein, J. T., A. F. Galambos, et al. (1992). "Compression-molded polyurethane block copolymers. 1. Microdomain morphology and thermomechanical properties." Macromolecules 25(23): 6195-6204.
126. Koberstein, J. T. and A. F. Galambos (1992). "Multiple melting in segmented polyurethane block copolymers." Macromolecules 25(21): 5618-5624.
127. Koberstein, J. T. and T. P. Russell (1986). "Simultaneous SAXS-DSC study of multiple endothermic behavior in polyether-based polyurethane block copolymers." Macromolecules 19(3): 714-720.
128. Leung, L. M. and J. T. Koberstein (1986). "DSC annealing study of microphase separation and multiple endothermic behavior in polyether-based polyurethane block copolymers." Macromolecules 19(3): 706-713.
129. Martin, D. J., G. F. Meijs, et al. (1999). "The influence of composition ratio on the morphology of biomedical polyurethanes." Journal of Applied Polymer Science 71(6): 937-952.
130. Martin, D. J., G. F. Meijs, et al. (1997). "The effect of average soft segment length on morphology and properties of a series of polyurethane elastomers. II. SAXS-DSC annealing study." Journal of Applied Polymer Science 64(4): 803-817.
131. Martin, D. J., G. F. Meijs, et al. (1996). "The effect of average soft segment length on morphology and properties of a series of polyurethane elastomers. I. Characterization of the series." Journal of Applied Polymer Science 62(9): 1377-1386.
132. Martin, D. J., G. F. Meijs, et al. (1996). "Effect of soft-segment CH2/O ratio on morphology and properties of a series of polyurethane elastomers." Journal of Applied Polymer Science 60(4): 557-571.
133. Chen, T. K., T. S. Shieh, et al. (1998). "Studies on the First DSC Endotherm of Polyurethane Hard Segment Based on 4,4'-Diphenylmethane Diisocyanate and 1,4-Butanediol." Macromolecules 31(4): 1312-1320.
134. Chen, T. K., J. Y. Chui, et al. (1997). "Glass Transition Behaviors of a Polyurethane Hard Segment based on 4,4'-Diisocyanatodiphenylmethane and 1,4-Butanediol and the Calculation of Microdomain Composition." Macromolecules 30(17): 5068-5074.
135. Li, Y., T. Gao, et al. (1992). "Multiphase structure of a segmented polyurethane: effects of temperature and annealing." Macromolecules 25(26): 7365-7372.
136. Ryan, A. J., C. W. Macosko, et al. (1992). "Order-disorder transition in a block copolyurethane." Macromolecules 25(23): 6277-6283.
137. Chan, C.-M., J. Wu, et al. (2002). "Polypropylene/calcium carbonate nanocomposites." Polymer 43(10): 2981-2992.
138. Zhang, Q.-X., Z.-Z. Yu, et al. (2004). "Crystallization and impact energy of polypropylene/CaCO3 nanocomposites with nonionic modifier." Polymer 45(17): 5985-5994.
139. Nielsen, L. E. (1974). Mechanical properties of polymers and composites. New York: Dekker.
140. Paul, B.; Amer. Inst Mech Eng 1960, 36, 218.

141. Counto, U. J. Mag Concr Res 1964, 16, 129.
142. Takayanagi, M.; Uemura, S.; Minami, S. J Polym Sci Part: C 1964, 5, 113.
143. Guth, E. (1945). "Theory of Filler Reinforcement." Journal of Applied Physics 16(1): 20-25.
144. A. S. Vaidya, N. Uddin, U. K. Vaidya: Vibration response of 3D space accessible sandwich composite, J. Reinf. Plas. and Compos. 28 (2009), pp. 1587-1599
145. Vaidya, U. K., P. K. Raju, et al. (1992). "Material damping studies on carbon-carbon composites." Carbon 30(6): 925-929.
146. Vaidya, U. K., S. Pillay, et al. (2006). "Impact and post-impact vibration response of protective metal foam composite sandwich plates." Materials Science and Engineering: A 428(1-2): 59-66.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A composite material capable of absorbing and dissipating ballistic forces, the composite material consisting of: a plurality of layers, wherein each layer of the plurality of layers consists of a nonwoven web and a reinforcing nanoparticle material, wherein the nonwoven web in each layer consists of an elastomer, wherein the elastomer is a thermoplastic polyurethane polymer having a shore A hardness value of 90, wherein the nanoparticle material is coated on the web via ultrasonic spray coating or incorporated in the web via melt blowing, wherein the nanoparticle material is present at an add on weight percent from about 0.2 wt % to about 0.4 wt %, and wherein the nanoparticle material consists of carbon$_{60}$, wherein the composite material absorbs and dissipates ballistic forces having a strain rate ranging from $10^4$ Hz to $10^6$ Hz.

2. The composite material of claim 1, wherein the nanoparticle material is coated on the nonwoven web via ultrasonic spray coating at 0.2 add on wt %, and wherein the composite material absorbs and dissipates high energy forces due to an at least 15 times increase in storage modulus and loss modulus as compared to the elastomer alone or the reinforcing nanoparticle material alone, wherein the high energy forces absorbed and dissipated have a strain rate of at least $10^4$ Hz.

3. The composite material of claim 1, wherein the nanoparticle material is present at 0.2 add on wt % and wherein the composite material has a damping ratio of at least 0.3 at a frequency range of about 600 to about 700 Hz.

4. The composite material of claim 1, wherein the nanoparticle material is present at 0.2 add on wt % and wherein the composite material has a damping ratio of at least 0.2 at a frequency range of about 1200 to about 1340 Hz.

5. An article capable of absorbing and dissipating high energy forces comprising:
the composite material of claim 1; and
an article,
wherein the article, when paired with the composite material, absorbs and dissipates high energy forces more than the article alone.

6. The article of claim 5, wherein the article is ballistic resistant.

* * * * *